US008339490B2

(12) United States Patent
Wakabayashi et al.

(10) Patent No.: US 8,339,490 B2
(45) Date of Patent: Dec. 25, 2012

(54) IMAGING DEVICE AND CAMERA WITH A LOCAL VOLTAGE SUPPLY CIRCUIT HAVING A CONSTANT LOAD CURRENT

(75) Inventors: Hayato Wakabayashi, Tokyo (JP); Yoshiaki Inada, Tokyo (JP)

(73) Assignee: Sony Corporation, Tokyo (JP)

( * ) Notice: Subject to any disclaimer, the term of this patent is extended or adjusted under 35 U.S.C. 154(b) by 1071 days.

(21) Appl. No.: 12/039,092

(22) Filed: Feb. 28, 2008

(65) Prior Publication Data
US 2008/0211951 A1 Sep. 4, 2008

(30) Foreign Application Priority Data

Mar. 1, 2007 (JP) ................................. 2007-051303

(51) Int. Cl.
*H04N 3/14* (2006.01)
*H04N 9/083* (2006.01)
*H04N 5/335* (2011.01)
(52) U.S. Cl. ........ 348/294; 348/272; 348/293; 348/297; 348/307; 348/302; 348/308
(58) Field of Classification Search .................. 348/294, 348/308, 273, 307, 293, 272; 341/144
See application file for complete search history.

(56) References Cited

U.S. PATENT DOCUMENTS

| 6,072,369 A * | 6/2000 | Dhong et al. .................... 331/17 |
| 2003/0011831 A1 * | 1/2003 | Sakurai et al. ................. 358/513 |
| 2005/0253942 A1 * | 11/2005 | Muramatsu et al. .......... 348/273 |

FOREIGN PATENT DOCUMENTS

JP 2005-328135 11/2005

* cited by examiner

*Primary Examiner* — Jason Chan
*Assistant Examiner* — Joel Fosselman
(74) *Attorney, Agent, or Firm* — SNR Denton US LLP

(57) ABSTRACT

An imaging device is disclosed. The device includes: a unit pixel that outputs an analog electric signal in accordance with a signal charge; a local voltage supply circuit that generates a local voltage different from an operation voltage; a reference signal generation section that generates a reference signal based on the local voltage provided by the local voltage supply circuit; and a processing section that converts, by referring to the reference signal generated by the reference signal generation section, the analog signal provided by the unit pixel into a digital signal. In the imaging device, the reference signal generation section keeps constant a load current of the local voltage supply circuit in an operating state.

8 Claims, 12 Drawing Sheets

IMAGING DEVICE AND CAMERA WITH A LOCAL VOLTAGE SUPPLY CIRCUIT HAVING A CONSTANT LOAD CURRENT

CROSS REFERENCES TO RELATED APPLICATIONS

The present invention contains subject matter related to Japanese Patent Application JP 2007-051303 filed in the Japanese Patent Office on Mar. 1, 2007, the entire contents of which being incorporated herein by reference.

BACKGROUND OF THE INVENTION

1. Field of the Invention

The present invention relates to an imaging device utilizing a CMOS (Complementary Metal Oxide Semiconductor) sensor or others, and a camera.

2. Description of the Related Art

As an example, a CMOS imaging device of Patent Document 1 (JP-A-2005-328135) converts, by pixels, any imaged object into an electric signal (pixel signal), and converts the analog electric signal into digital image data using an analog digital converter equipped in a column processing circuit.

By taking as an example the column processing circuit of the CMOS imaging device of Patent Document 1, the outline of the operation thereof is described by referring to FIG. 12.

FIG. 12 is a block diagram for illustrating the outline of the operation of the column processing circuit.

In FIG. 12, a unit pixel 200 is configured to include a photodiode (PD) 201 that converts an incoming light into a signal charge, a transfer gate (TRF) 203 for transferring the signal charge to a node ND 202, a reset gate (RET) 204 for resetting the voltage of the node ND 202 to be of a predetermined value, and an amplifier gage (AMP) 205 that amplifies the voltage of the node ND 202, for example. Note that, for the sake of simplification, FIG. 12 shows only one unit pixel 200, but in actuality, a plurality of unit pixels 200 are arranged in matrix of a predetermined array shape.

Although no detailed description is given for the operation of the unit pixel 200, the unit pixel 200 converts an incoming light into an electric signal, and the resulting electric signal is transferred by a vertical signal line 206. This electric signal is forwarded to a first input terminal of a voltage comparison section 209 over the vertical signal line 206. The voltage comparison section 209 is the one configuring an AD converter 208 in a column processing circuit 214. A digital analog converter 211 equipped in the reference signal generation section 210 generates a predetermined reference signal, e.g., voltage signal of ramp (RMP) waveform. This reference signal is forwarded to a second input terminal of the voltage comparison section 209 over a ramp signal line 212. This reference signal is generated with reference to a standard reference voltage Vref.

The voltage comparison section 209 then receives, on a pixel-array column basis, the electric signal from the unit pixel 200 and the reference signal from the reference signal generation section 210, and compares these signals in terms of voltage. When the voltages of the signals both reach the same level, the voltage comparison section 209 reverses the output voltage for output to a counter 213.

The counter 213 counts the time until the voltage comparison section 209 completes the process of such a comparison, and when the reversed voltage comes from the voltage comparison section 209, responsively stops the time counting.

The counter 213 then stores the count value at the point of time as digital data, and forwards the digital data to a predetermined signal processing circuit.

As such, the column processing circuit 214 converts, for every pixel-array line, an analog pixel signal into digital image data.

SUMMARY OF THE INVENTION

The imaging device of such a configuration, however, often causes a phenomenon of noise streaks of generating streaks (horizontal streaks) in the line direction of a captured image.

Such noise streaks are generated in the course of converting a captured image into digital image data. Reading of pixel data is performed for every line, and the voltage comparison section makes a comparison between a reference signal from the reference signal generation section and a pixel signal from the unit pixel. The issue here is that if the reference signal includes any noise, the time to be taken until the completion of such a signal comparison process in the voltage comparison section will show a difference, on a line basis, from the time that is originally supposed to be. This time difference will cause a deviation in the result of conversion into digital data in the AD converter, thereby causing noise streaks.

The noise mixture to the reference signal is caused also by some mixture of circuit noise due to thermal noise or others.

It is thus desirable to provide an imagine device and a camera that can achieve noise reduction and image quality improvement.

According to a first embodiment of the present invention, there is provided an imaging device that includes: a unit pixel that outputs an analog electric signal in accordance with a signal charge; a local voltage supply circuit that generates a local voltage different from an operation voltage; a reference signal generation section that generates a reference signal based on the local voltage provided by the local voltage supply circuit; and a processing section that converts, by referring to the reference signal generated by the reference signal generation section, the analog signal provided by the unit pixel into a digital signal. In the imaging device, the reference signal generation section keeps constant a load current of the local voltage supply circuit in an operating state.

Preferably, the frequency characteristics of the local voltage supply circuit are of a narrow band.

Preferably, the local voltage comes from the outside of the reference signal generation section.

Preferably, the reference signal generation section includes: a standard resistance; a plurality of constant current sources that determine a parameter of the reference signal; and a path selection section that changes a path of the load current flowing into each of the constant current sources to first and second paths. The constant current sources are connected in parallel to the standard resistance connected to the local voltage supply circuit, form the first path through which the load current flows thereinto from the local voltage supply circuit via the standard resistance, and form the second path through which the load current flows thereinto from the local voltage supply circuit. The path selection section performs a path change to the first or second path to make constant the load current of the local voltage supply circuit in the operating state.

Preferably, the local voltage supply circuit includes a variable resistance that can be adjusted in resistance value, the standard resistance can be changed in resistance value, and the variable resistance and the standard resistance are both defined by resistance value to determine the parameter of the reference signal, and keep constant a consumption current of the reference signal generation section in the operating state.

According to a second embodiment of the present invention, there is provided an imaging device, including: an effective area including a charge generation section that generates a charge corresponding to an incoming electromagnetic wave, and a matrix array of a unit pixel that generates an analog signal in accordance with the charge generated by the charge generation section; a local voltage supply circuit that generates a local voltage different from an operation voltage; a reference signal generation section that generates a reference signal based on the local voltage provided by the local voltage supply circuit; and a processing section that converts, by referring to the reference signal generated by the reference signal generation section, the analog signal provided by the unit pixel into a digital signal. In the imaging device, the reference signal generation section keeps constant a load current of the local voltage supply circuit in an operating state.

According to a third embodiment of the present invention, there is provided a camera, including: an imaging device; an optical system that guides an incoming light toward a pixel section of the imaging device; and a signal processing circuit that processes an output signal of the imaging device. In the camera, the imaging device includes: a unit pixel that outputs an analog electric signal in accordance with a signal charge; a local voltage supply circuit that generates a local voltage different from an operation voltage; a reference signal generation section that generates a reference signal based on the local voltage provided by the local voltage supply circuit; and a processing section that converts, by referring to the reference signal generated by the reference signal generation section, the analog signal provided by the unit pixel into a digital signal. In the camera, the reference signal generation section keeps constant a load current of the local voltage supply circuit in an operating state.

According to a fourth embodiment of the present invention, there is provided a camera, including: an imaging device; an optical system that guides an incoming light toward a pixel section of the imaging device; and a signal processing circuit that processes an output signal of the imaging device. In the camera, the imaging device includes: an effective area including a charge generation section that generates a charge corresponding to an incoming electromagnetic wave, and a matrix array of a unit pixel that generates an analog signal in accordance with the charge generated by the charge generation section; a local voltage supply circuit that generates a local voltage different from an operation voltage; a reference signal generation section that generates a reference signal based on the local voltage provided by the local voltage supply circuit; and a processing section that converts, by referring to the reference signal generated by the reference signal generation section, the analog signal provided by the unit pixel into a digital signal. In the camera, the reference signal generation section keeps constant a load current of the local voltage supply circuit in an operating state.

According to the embodiments of the invention, the reference signal generation section keeps constant the load current of the local voltage supply circuit in the operating state.

According to the embodiments of the invention, the noise level can be reduced in an imaging device and a camera, thereby favorably increasing the image quality.

DESCRIPTION OF THE PREFERRED EMBODIMENT

In the below, an embodiment of the invention is described with reference to the accompanying drawings. Note that, in the below, exemplified is a case where a CMOS imaging device being an exemplary imaging device of X-Y address type is used as a device. In the CMOS imaging device, every pixel is presumed as being an NMOS (N-channel Metal Oxide Semiconductor) or a PMOS (P-channel Metal Oxide Semiconductor).

This is surely no more than an example, and a target device is not restrictive to an imaging device of MOS (Metal Oxide Semiconductor) type. The following embodiment can be entirely applicable to every type of semiconductor device for use to detect a physical quantity distribution including a plurality of lines or matrixes of unit components being sensitive to electromagnetic waves coming from the outside, e.g., lights and radiation rays.

Figure 1:
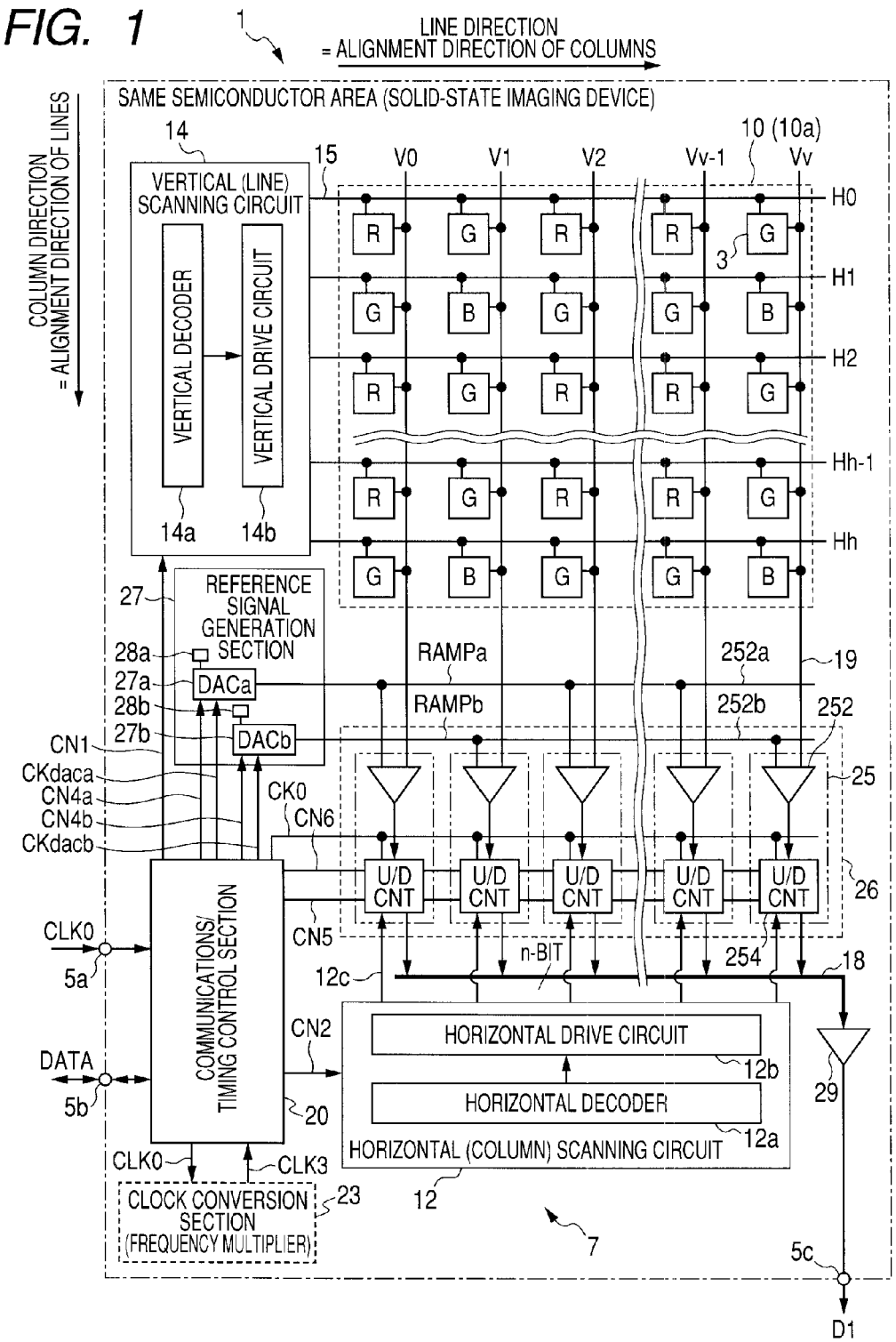
FIG. 1 is a diagram showing a first exemplary configuration of an imaging device of an embodiment.
Figure 2:
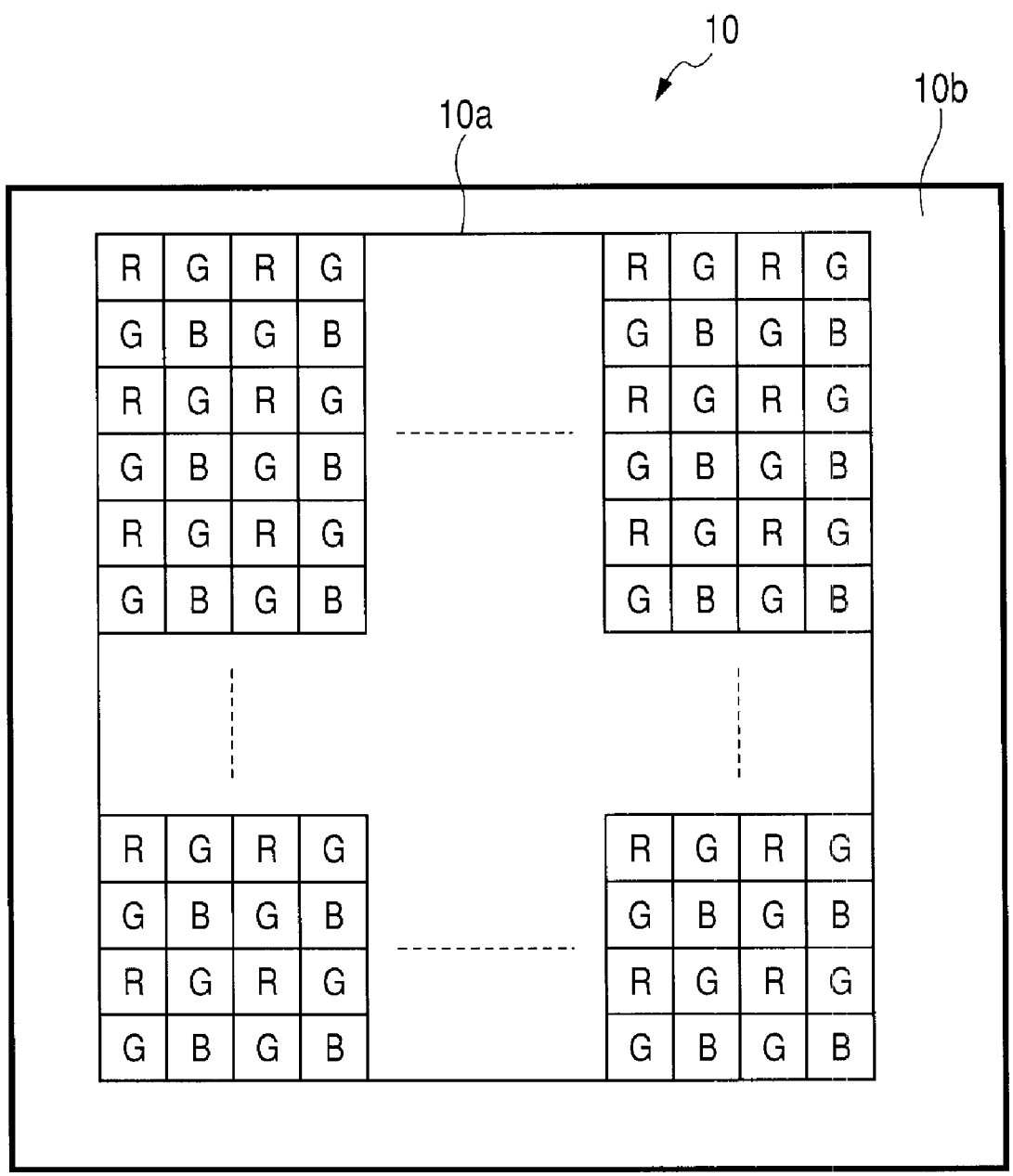
FIG. 2 is a diagram showing an exemplary relationship between an effective area of a pixel section and a standard pixel area providing optical black in the embodiment.

FIG. 1 is a diagram schematically showing the configuration of an exemplary CMOS imaging device, i.e., COMS image sensor, as an embodiment of a semiconductor device according to the invention. FIG. 2 is a diagram showing an exemplary relationship between an effective image area, i.e., effective section, in a pixel section, i.e., imaging section, and a standard pixel area providing optical black.

The imaging device 1 is provided with a pixel section in which a plurality of pixels are aligned in line and column, i.e., in the shape of two-dimensional matrix. The pixels include light-receiving elements, i.e., exemplary charge generation sections, performing signal output in accordance with the amount of incoming light. A signal output from each of the pixels is a voltage signal, and a CDS (Correlated Double Sampling) processing function section, an analog digital converter (ADC), and others are disposed in parallel column.

The expression of "a CDS processing function section, an analog digital converter, and others are disposed in parallel column" means that a plurality of components, i.e., CDS processing function section and analog digital converter, are disposed substantially in parallel to a vertical signal line 19 being a vertical column. The function sections may be all disposed, when the device is viewed from the above, on one end edge side in the column direction with respect to the pixel section 10, i.e., the output side located at the lower part of the drawing, or may be disposed at two sides, i.e., on one end edge side in the column direction with respect to the pixel section 10, i.e., the output side located at the lower part of the drawing, and on the opposite other end edge side, i.e., the upper part of the drawing. If with the latter case, horizontal scanning sections in charge of read scanning (horizontal scanning) in the line direction may be also disposed at such two end edge sides, and may be so configured as to operate separately.

A typical exemplary placement in which a CDS processing function section and an analog digital converter are disposed in parallel column is of a column type, i.e., a CDS processing function section and an analog digital converter are provided for every vertical column in a portion called column area located on the output side of the imaging section for sequential reading toward the output side. Such a column type is surely not restrictive, and various other types are possible, e.g., a type of allocating a CDS processing function section and an analog digital converter to every group of a plurality of, e.g., two, adjacent vertical signal lines 19, i.e., vertical columns, and a type of allocating a CDS processing function section and an analog digital converter to every group of N (N is a positive integer) vertical signal lines 19, i.e., vertical columns, at intervals of N (with N-1 pieces of signal lines between any two groups of signal lines).

Any types other than the column type are all of a configuration that a plurality of vertical signal lines 19, i.e., vertical columns, in a group share the same CDS processing function section and analog digital converter. Accordingly, as witching circuit, i.e., switch, is provided for signal supply to the CDS processing function section and the analog digital converter. The signal for supply is a pixel signal coming from the side of the pixel section 10 for a plurality of columns. There may also need to provide a memory or others for storage of output signals depending on the type of processing in the subsequent stages.

In any of those types, with the configuration of allocating a CDS processing function section and an analog digital converter to a group of a plurality of vertical signal lines 19, i.e., vertical columns, the pixel signals are each subjected to signal processing after signal reading on a pixel column basis. Accordingly, compared with the type in which such signal processing is executed in each of the unit pixels, the unit pixels can be all simplified in configuration, thereby being able to ready to meet some requirements of an image sensor, e.g., pixel increase, downsizing, and lower cost.

Such a configuration also enables to process pixel signals of a line all at once in a plurality of signal processing sections disposed in parallel column. Accordingly, compared with a configuration in which such signal processing is performed in a CDS processing function section and an analog digital converter on the output circuit side or in the outside of the device, the signal processing sections can be operated at lower speed, and this is considered advantageous in terms of power consumption, band characteristics, and noise. Conversely, if with the same power consumption, band characteristics, and others, the sensor can be operated at higher speed in its entirety.

Note that, the configuration of a column type can achieve operation at lower speed, and this is considered advantageous in terms of power consumption, band characteristics, noise, and more. There is also an advantage of requiring no switching circuit, i.e., switch. In the embodiment below, such a column type is described unless otherwise specified.

As shown in FIG. 1, the imaging device 1 of the embodiment is configured to include the pixel section, i.e., imaging section, 10, a drive control section 7, a column processing section 26, a reference signal generation section 27, and an output circuit 29. In the pixel section 10, a plurality of unit pixels 3 are arranged in line and column, i.e., in the shape of square matrix. The unit pixels 3 are each shaped substantially square. The drive control section 7 is disposed outside of the pixel section 10. The reference signal generation section 27 makes a supply of reference voltage to the column processing section 26 for AD conversion use.

As an alternative configuration, in the preceding or subsequent stage of the column processing section 26, if required, an AGC (Auto Gain Control) circuit or others may be provided in a semiconductor area same as that of the column processing section 26. The AGC circuit or others are those provided with a function of signal amplification. When AGC is applied in the stage preceding to the column processing section 26, it will be analog amplification, and when AGC is applied in the stage subsequent thereto, it will be digital amplification.

The drive control section 7 has a function of circuit control for sequential signal reading from the pixel section 10. The drive control section 7 is configured to include, for example, a horizontal scanning circuit, i.e., column scanning circuit, 12, a vertical scanning circuit, i.e., line scanning circuit, 14, and a communications/timing control section 20. The horizontal scanning circuit 12 applies control over column addresses and column scanning, and the vertical scanning circuit 14 applies control over line addresses and line scanning. The communications/timing control section 20 has a function of generating internal clocks, for example.

In the drawing, as denoted by dotted lines in the vicinity of the communications/timing control section 20, a clock conversion section 23 may be additionally provided. This clock conversion section 23 is an example of a high-speed clock generation section, and generates a pulse of a clock frequency higher at speed than an incoming clock frequency. The communications/timing control section 20 generates internal clocks based on an input clock, i.e., master clock, CLK0 provided via a terminal 5a, and a high-speed clock generated by the clock conversion section 23.

By using a signal based on the high-speed clock generated by the clock conversion section 23 as such, the AD conversion process and others can be operated at higher speed. Moreover, using a high-speed clock also enables to go through processes of movement extraction and compression, which require high-speed calculation. Also enabled is output of video data D1 to the outside of the device. The video data D1 is a result of serializing parallel data coming from the column processing section 26. The resulting configuration accordingly achieves high-speed operation output with the terminals fewer in number than bits of digital data being a result of AD conversion.

The clock conversion section 23 is provided therein with a frequency multiplier circuit that generates a pulse of a clock frequency higher at speed than an incoming clock frequency. This clock conversion section 23 receives a low-speed clock CLK2 from the communications/timing control section 20, and based thereon, generates a clock of a frequency twice as much as that of the low-speed clock CLK2. For such a frequency multiplier circuit in the clock conversion section 23, a k1 frequency multiplier circuit may be used if with multiples of a frequency of k1 low-speed clock CLK2 so that various many known circuits may be used.

For the sake of simplicity, FIG. 1 is not showing lines and columns in their entirety. In actuality, every line and column includes a few tens to a few thousands of unit pixels 3, and the pixel section 10 is configured thereby. The unit pixel 3 is configured by, typically, a photodiode being a light-receiving element, i.e., charge generation section, and an in-pixel amplifier with a semiconductor element, e.g., transistor, for amplification use.

The in-pixel amplifier is of floating diffusion amplifier configuration, for example. As an example, with respect to the charge generation section, the in-pixel amplifier may be of a configuration including four general-purpose transistors as CMOS sensors, e.g., a transistor for reading selection use being an example of a charge reading section, i.e., transfer gate section/reading gate section, a reset transistor being an example of a reset gate section, a transistor for vertical selection use, and a transistor for amplifier use of a source follower configuration being an example of a detection element for use to detect any potential change of the floating diffusion.

As shown in FIG. 2, the pixel section 10 includes not only an effective image area, i.e., effective section, 10a being an effective area for image capturing but also a standard image area 10b around the effective image area (effective section) 10a for optical black. As an example, standard pixels of a few lines, e.g., one to ten lines, are arranged at upper and lower portions of the effective image area 10a in the direction of the vertical columns for optical black, and standard pixels of a few to a few tens of pixels, i.e., three to forty pixels, are arranged at right and left portions including the effective image area 10a in the direction of the horizontal lines for optical black.

Such standard pixels for optical black are each light-shielded on the light-receiving surface side to protect, from light, the charge generation sections each being a photodiode or others. The pixel signals from such standard pixels are used for black standard of video signals.

In the imaging device 1 of the embodiment, the pixel section 10 is capable of color imaging. That is, in the pixel section 10, the light-receiving surface of each of the charge generation sections, e.g., photodiodes, toward which electromagnetic waves, e.g., lights in this example, are directed is provided with a color filter. The color filter is a part of a color separation filter configured by various color filters varying in color for color imaging.

In the FIG. 2 example, used is a basic color filter of a so-called Bayer array, and the pattern of the color separation filter is formed plurally with a unit of two pixels by two pixels in such a manner that the unit pixels 3 aligned in the square matrix correspond to a three-color filter of red (R), green (G), and blue (B). As such, the pixel section 10 is configured.

As an example, a first color pixel is disposed to any odd lines and odd columns for sensing a first color (red; R), a second color pixel is disposed to any odd lines and even columns and to any even lines and odd columns for sensing a second color (green; G), and a third color pixel is disposed to any even lines and even columns for sensing a third color (blue; B). As such, two color pixels of R/G or G/B are disposed in a checkered pattern alternately in line.

With the colors of the pattern of such a basic color filter of Bayer array, two colors of R/G or G/B appear alternately for every two pixels both in line and column directions.

The drive control section 7 is configured to include also the horizontal scanning circuit 12, the vertical scanning circuit 14, and the communications/timing control section 20. The horizontal scanning circuit 12 serves as a read scanning section for reading a count value from the column processing section 26. Such components in the drive control section 7 are formed as a piece to a semiconductor area such as monocrystalline silicon together with the pixel section 10 using the technology similar to the technology of manufacturing a semiconductor integrated circuit, and the resulting component piece serves as an imaging device being an example of a semiconductor system.

The unit pixels 3 are each connected to the vertical scanning circuit 14 via a line control line 15 for line selection use, and to the column processing section 26 via the vertical signal line 19. The column processing section 26 includes a column AD circuit 25 (corresponding to the processing section of the embodiment in the invention) for every vertical column. Herein, the line control line 15 denotes a wiring in its entirety directing to the pixel from the vertical scanning circuit 14.

The horizontal scanning circuit 12 and the vertical scanning circuit 14 are configured to include a decoder as will be described later, and are so configured as to start the shift operation, i.e., scanning, in response to control signals CN1 and CN2 coming from the communications/timing control section 20. As such, the line control line 15 includes various types of pulse signals, e.g., reset pulse RST, transfer pulse TRF, and DRN control pulse DRN, for use to drive the unit pixels 3.

Although not shown, the communications/timing control section 20 is provided with a function block of a timing generator TG, e.g., an example of a reading address control device, and a function block of a communications interface. The function block of a timing generator TG makes a supply of clocks and pulse signals of a predetermined timing needed for the components to operate, and the function block of a communications interface receives a master clock CLK0 via the terminal 5a and data DATA issuing a command of an operation mode or others via a terminal 5b, and outputs data including information about the imaging device 1.

For example, a horizontal address signal is output to a horizontal decoder 12a, and a vertical address signal is output to a vertical decoder 14a. The decoders 12a and 14a then responsively select any line or column corresponding thereto.

At this time, because the unit pixels 3 are disposed in a two-dimensional matrix, scan reading, i.e., vertical scan reading, is performed to access analog pixel signals on a line basis, i.e., in parallel column, for signal capturing. Herein, the analog pixel signals are those generated by the pixel signal generation section 5 to be output in the column direction over the vertical signal lines 19. Thereafter, another scan reading, i.e., horizontal scan reading, is performed to make an access in the line direction, i.e., direction along which the vertical columns are arranged, for reading of pixel signals to the output side. Herein, the pixel signals to be output to the output side are digitalized pixel data in this example. With such scan reading, an attempt is successfully made to increase the speed for reading of pixel signals and pixel data. Such scan reading is surely not the only option, and random access is also possible for reading only information about any needed unit pixel 3 through direct addressing of unit pixel 3 whatever being reading target.

The communications/timing control section 20 of the embodiment makes a clock supply to the components inside of the device, e.g., the horizontal scanning circuit 12, the vertical scanning circuit 14, and the column processing section 26. The supply of clock here includes a clock CLK1 of a frequency same as that of a master clock CLK0 provided via the terminal 5a, and low-speed clocks as a result of dividing, into two or more, the frequency of the clock CLK1. In the below, such clocks as a result of frequency division into two or more are collectively referred to as low-speed clock CLK2.

The vertical scanning circuit 14 selects a line of the pixel section 10, and makes a supply of pulse needed for the line. The vertical scanning circuit 14 is configured to include, for example, a vertical decoder 14a and a vertical drive circuit 14b. The vertical decoder 14a serves to define a reading line in the vertical direction, i.e., select a line of the pixel section 10, and the vertical drive circuit 14b serves to makes a supply of pulse, for driving, to the line control line 15 with respect to the unit pixels 3 on the reading address, i.e., line direction, defined by the vertical decoder 14a. Note here that the vertical decoder 14a selects not only a line for signal reading but also a line for electronic shutter use, for example.

The horizontal scanning circuit 12 serves to sequentially select the column AD circuit 25 in the column processing section 26 in synchronization with the low-speed clock CLK2, and guides the signals to a horizontal signal line, i.e., horizontal output line, 18. The horizontal scanning circuit 12 is configured to include, for example, the horizontal decoder 12a and a horizontal drive circuit 12b. The horizontal decoder 12a serves to define a reading column in the horizontal direction, i.e., select any of the column AD circuits 25 in the column processing section 26, and the horizontal drive circuit 12b serves to guide the signals of the column processing section 26 to the horizontal signal line 18 in accordance with the reading address defined by the horizontal decoder 12a. Note that, the horizontal signal line 18 is provided as many as the number of bits n (n is a positive integer) handled by the column AD circuits 25, e.g., when the number of bits is 10 (=n), provided are 10 signal lines as many as the bits.

In the imaging device 1 configured as such, a pixel signal from the unit pixel 3 is directed, for every vertical column, to the column AD circuits 25 in the column processing section 26 over the vertical signal line 19.

The column AD circuits 25 of the column processing section 26 each receive pixel signals of a column, and then process the signals. For example, the column AD circuits 25 are each provided with an ADC (Analog Digital Converter) circuit that converts an analog signal into 10-bit digital data using a low-speed clock CLK2, for example.

Although the configuration of the ADC circuit will be described in more detail later, the ADC circuit performs AD conversion by starting counting using a clock signal at the same time as supplying a ramp-shaped reference signal (reference voltage) RAMP to a comparator (voltage comparator), and by continuously counting until a pulse signal is derived through comparison of an analog pixel signal provided over the vertical signal line 19 with the reference signal RAMP.

With some designing of the circuit configuration, the ADC circuit is allowed to perform, with respect to a voltage-mode pixel signal provided over the vertical signal line 19, not only AD conversion but also processing of taking a difference between a signal level (noise level) immediately after the pixel resetting and a signal component Vsig being true (corresponding to the amount of receiving lights). This accordingly enables to eliminate a noise signal component called fixed pattern noise (FPN) and reset noise.

The pixel data digitalized by such column AD circuits 25 is transmitted to the horizontal signal line 18 via a horizontal selection switch, and then to the output circuit 29. The horizontal selection switch is not shown but is driven by a horizontal selection signal coming from the horizontal scanning circuit 12. Note that 10 bits is no more than an example, and the number of bits may be smaller than 10, e.g., 8 bits, or larger than 10, e.g., 14 bits.

With such a configuration, from the pixel section 10 including light-receiving elements each serving as a charge generation section are arranged in matrix, a pixel signal is sequentially output for every line with respect to each vertical column. As a result, a piece of image, i.e., frame image, corresponding to the pixel section 10 with the light-receiving elements being arranged in matrix as such is displayed by a collection of pixel signals in the pixel section 10 in its entirety.

The reference signal generation section 27 is configured to include DA converters (DAC) 27a and 27b, and local voltage supply circuits 28a and 28b. The DA converters 27a and 27b are each a function component generating a reference signal for AD conversion use in accordance with the color type and pattern of the color filter configuring the color separation filter in the pixel section 10. The local voltage supply circuits 28a and 28b each supply a predetermined level of voltage to the DA converters.

When a selection is made which pixel section 10, i.e., device, is to be used, the color filters in the color separation filter are defined by color type and pattern, thereby being able to uniquely specify the color of the color filter located at any arbitrary position in the two-dimensional matrix. Thus specified color pattern then uniquely specifies the repeating cycle of the color filters in the line and column directions. Accordingly, any one line being a processing target of the column AD circuits 25 disposed in parallel column carries thereon only pixel signals not of all of the colors used in the color separation filter but of only fewer number of predetermined colors determined by the repeating cycle.

Therefore, with respect to the direction of the line being a reading unit of pixel signals, by setting the number of the column AD circuits 25 to the number corresponding to the combination of the color filters of predetermined colors found in the repeating cycle of the color filter, the number of the column AD circuits 25 is reduced to less than the number of colors of the color filters found in the repeating cycle of the color filter in the two-dimensional space.

The reference signal generation section 27 is also so configured that reference signals RAMPa and RAMPb respectively output from the DA converters 27a and 27b are substantially directly transmitted to voltage comparison sections 252 corresponding to the color filters sharing the same color characteristic over the common signal lines 252a and 252b, which are independent from each other.

For a direction different from the line direction being a reading unit, i.e., for a direction of the vertical columns, a color correspondence reference signal generation section is provided to each of the DA converters, i.e., reference signal generation output sections, as many as the number of combinations of predetermined colors in the repeating cycle of the color filters in the direction of the vertical columns. The color correspondence reference signal generation section shows a change by an initial value defined by the point of view of the change characteristics, i.e., specifically slope, corresponding to the color characteristics of color pixels, or the non-color characteristics different from the color characteristics, e.g., black standard and offset component of the circuits. Any of the resulting outputs from the color correspondence reference signal generation sections is to be selected depending on the change of a processing target line.

In this case, when there are color filters of the same color in the repeating cycle of the color filters in the two-dimensional space like the Bayer array, for example, for such color filters of the same color, each of the individual DA converters, i.e., reference signal generation output sections, may serve as a reference signal generation section corresponding to one color.

Alternatively, for each of the individual DA converters, i.e., reference signal generation output sections, every time a processing target line is changed, the communications/timing control section 20 may set an initial value in accordance with any combination change of colors in the repeating cycle of the color filter resulted from the line change. The initial value is the one based on the point of view different from the change characteristics, i.e., specifically slope, corresponding to the color characteristics of any corresponding color pixels, or the non-color characteristics different from the color characteristics such as black standard and offset component of the circuits. If this is the case, there is no more need to provide the color correspondence reference signal generation section or a selection section to each of the individual DA converters, i.e., reference signal generation output sections, for selecting any of the color correspondence reference signal generation sections.

With any of the above configurations, the DA converters, i.e., reference signal generation output sections, each change and output the change characteristics, i.e., specifically slope, of a reference signal (analog reference voltage) generated thereby depending on the characteristics of the color filter, i.e., analog pixel signal. Such change characteristics is made in response to any change of a processing target line, i.e., any combination change of predetermined colors in the processing target line. The initial value is set based on the point of view different from the color characteristics, e.g., black standard and offset components of the circuits.

The imaging device 1 in this example is of basic Bayer array, and as described above, the repeating cycle of the color filter is of every two lines and two columns. Reading of a pixel signal is performed on a line basis, and input of a pixel signal is made for every vertical signal line 19 to each of the column AD circuits 25 disposed in parallel column. As such, each processing target line carries thereon pixel signals of only two colors of R/G or G/B. In consideration thereof, in this embodiment, the DA converter 27a is specifically provided for odd lines, and the DA converter 27b is specifically provided for even lines.

Also in this embodiment, the local voltage supply circuits 28a and 28b are specifically provided for reduction of noise in reference signals to be caused by the DA converters.

Note here that such components in the reference signal generation section 27 of the embodiment, i.e., the DA converters 27a and 27b and the local voltage supply circuits 28a and 28b, will be described in more detail later.

The DA converters 27a and 27b each generate stair-step-shaped sawtooth waves (ramp voltage) from an initial value indicated by a control signal CN4 (CN4a and CN4b) coming from the communications/timing control section 20. This wave generation is performed in synchronization with count clocks CKdaca and CKdacb (may be the same as count clock CK0) coming from the communications/timing control section 20. Thus generated sawtooth waves are forwarded to any corresponding column AD circuits 25 in the column processing section 26 as reference signals (ADC standard signals) RAMPa and RAMPb for AD conversion use. Note here that, although not shown, a filter may be provided for noise prevention.

When performing AD conversion using the voltage comparison section 252 and a counter section 254 for a signal component Vsig in the pixel signal voltage Vx at a predetermined position, the DA converters 27a and 27b make a setting of initial voltage of their reference signals RAMPa and RAMPb. This initial value setting is made to derive a value different from the value at the time of AD conversion for a reset component ΔV while reflecting the pixel characteristics and variations observed in the circuits. As to the reference signals RAMPa and RAMPb, their slopes βa and βb are also set as to match the pixel characteristics in consideration of the color filter array.

To be specific, first of all, the initial voltages Vas and Vbs of the reference signals RAMPa and RAMPb for a signal component Vsig are assumed as being calculated based on a signal derived from a plurality of arbitrary pixels generating black standard. Note that the pixels of generating black standard are assumed as each being a pixel including a light-shielding layer, e.g., photodiode serving as a photoelectric conversion element configuring the charge generation section 32 disposed outside of color pixels. The placement of such pixels, e.g., the placement location and the placement number, and means for light shielding are not specifically restricted.

The initial voltage is assumed as including each different variation component caused due to the characteristics of each of the DA converters 27a and 27b. The initial voltages Vas and Vbs are generally set lower by the offsets OFFa and OFFb compared with the initial voltages Var and Vbr of the reference signals RAMPa and RAMPb for the reset component ΔV.

Even if the reference signals RAMPa and RAMPb for the reset component ΔV share the same value for their initial voltages Var and Vbr, the offsets OFFa and OFFb generally cause a difference in value. The reference signals RAMPa and RAMPb for the signal component Vsig thus do not share the same value.

Note here that the initial voltage Vas and Vbs of the reference signals RAMPa and RAMPb for the signal component Vsig may include not only signals derived from pixels of generating black standard but also any arbitrary offset.

For control over the offsets OFFa and OFFb to be applied by the DA converters 27a and 27b in the reference signal generation section 27, the DA converters 27a and 27b are so configured as to calculate the initial voltage on its own with a function provided thereto for calculating the initial voltage. Alternatively, the communications/timing control section 20 maybe provided with a function of calculating an initial voltage based on a signal derived from a plurality of arbitrary standard pixels generating black standard, and offset control may be performed based on an initial value indicated by the control signal CN4 provided by the communications/timing control section 20.

Still alternatively, instead of providing a function of calculating an initial voltage of a reference voltage to the communications/timing control section 20 and the DA converters 27a and 27b in the chip, an initial voltage may be calculated based on a signal derived from standard pixels generating black standard in any external system outside of the chip, information about the initial voltage may be notified via the terminal 5b to the communications/timing control section 20 as a part of the operation mode, and using the control signal CN4 from the communications/timing control section 20, a notification may be made to the reference signal generation section 27.

Note here that the stair-step-shaped reference signals of the reference signal generation section 27, more in detail, the reference signal RAMPa of the DA converter 27a and the reference signal RAMPb of the DA converter 27b, may be generated based on a high-speed clock coming from the clock conversion section 23, e.g., a frequency-multiplied clock generated by the frequency multiplier circuit. If this is the case, a change can be made quicker than generating the reference signals based on a master clock CLK0 coming via the terminal 5a.

The control signals CN4a and CN4b to be provided by the communications/timing control section 20 to the DA converter 27a of the reference signal generation section 27 include information for directing the slope of the ramp voltage, i.e., degree of change; amount of temporal change, on a comparison process basis.

The column AD circuit 25 has an AD conversion function of n bits, configured by the voltage comparison section (comparator) 252, and the counter section 254. The voltage comparison section 252 makes a comparison between the reference signal RAMP generated by the DA converter 27a of the reference signal generation section 27 and an analog pixel signal coming from the unit pixels 3 for every line control line 15 (H0, H1, . . . ) over the vertical signal lines 19 (V0, V1, . . . ). The counter section 254 counts the time until the voltage comparison section 252 completes the comparison process, and stores the result.

The communications/timing control section 20 serves as a control section for changing a mode of the counting process in the counter section 254 depending on what is the processing target for the voltage comparison section 252 in the comparison process, i.e., which of the reset component ΔV of a pixel signal and the signal component Vsig thereof is being subjected to the comparison process. From such a communications/timing control section 20 to the counter section 254 of each of the column AD circuits 25, a mode control signal CN5 is being supplied for directing in which mode the counter section 254 is supposed to operate, i.e., down-count mode or up-count mode.

One input terminal RAMP of the voltage comparison section 252 is provided with a stair-step-shaped reference signal RAMP generated by the reference signal generation section 27 as are the input terminals RAMP of other voltage comparison sections 252. The other input terminal of the voltage comparison section 252 is connected with the vertical signal line 19 of any corresponding vertical column, and is provided with pixel signal voltages from the pixel section 10. The output signal of the voltage comparison section 252 is supplied to the counter section 254.

To a clock terminal CK of the counter section 254, as are clock terminals CK of other counter sections 254, a count clock CK0 is being supplied from the communications/timing control section 20.

Using an up-down counter (U/D CNT) of sharing use, the count process is performed while making an operation change between the down-count operation and the up-count operation, specifically alternately. The counter section 254 uses a synchronous counter, from which a count output value is output in synchronization with the count clock CK0.

If such a synchronous counter is used, every flip-flop (basic component of counter) is restricted in operation by the count clock CK0. Therefore, when there is a demand for the operation with the higher frequency, the counter section 254 is preferably an asynchronous counter suiting to the high-speed operation. This is because the operation-restricting frequency is determined only by the restriction frequency of the first flip-flop (basic component of counter).

The counter section 254 is provided with a control pulse from the horizontal scanning circuit 12 over a control line 12c. The counter section 254 has a latch function of storing the count result, and stores the counter output value until a command comes over the control line 12c by the control pulse.

The column AD circuit 25 configured as such is provided to every vertical signal line 19 (V0, V1, . . . ) as described above, thereby configuring the column processing section 26 being an ADC block of parallel-column configuration.

The output side of each of the column AD circuits 25 is connected to the horizontal signal line 18. As described above, the horizontal signal line 18 is of a n-bit width being the same as the bit width of the column AD circuit 25, and is connected to the output circuit 29 via n pieces of sense circuits respectively corresponding to output lines that are not shown.

In such a configuration, the column AD circuit 25 performs the count operation in a period of pixel signal reading equivalent to a horizontal blanking period, and outputs the count result at any predetermined timing. That is, first of all, in the voltage comparison section 252, a comparison is made between the ramp waveform voltage provided by the reference signal generation section 27 and the pixel signal voltage provided over the vertical signal line 19. When these voltages have the same value, the comparator output of the voltage comparison section 252 is reversed, i.e., level change from high to low in this example.

In synchronization with the ramp waveform voltage generated by the reference signal generation section 27, the counter section 254 starts its count operation in the down-count mode or in the up-count mode. Upon reception of information about the comparator output being reversed, the counter section 254 stops its count operation, and latches (retains/stores) the count value at this point of time as pixel data so that AD conversion is completed.

Thereafter, the counter section 254 sequentially outputs thus stored/retained pixel data from an output terminal 5c to the outside of the column processing section 26 or to the outside of the chip including the pixel section 10. This data output is made based on the shift operation by a horizontal selection signal CH(i) coming from the horizontal scanning circuit 12 over the control line 12c at any predetermined timing.

Although not specifically shown as there is no direct relationship with the embodiment, other types of signal processing circuits may be provided as the components of the imaging device 1.

First Exemplary Configuration of Reference Signal Generation Section 27

Described next is a first exemplary configuration of the reference signal generation section 27 of this embodiment.

Figure 3:
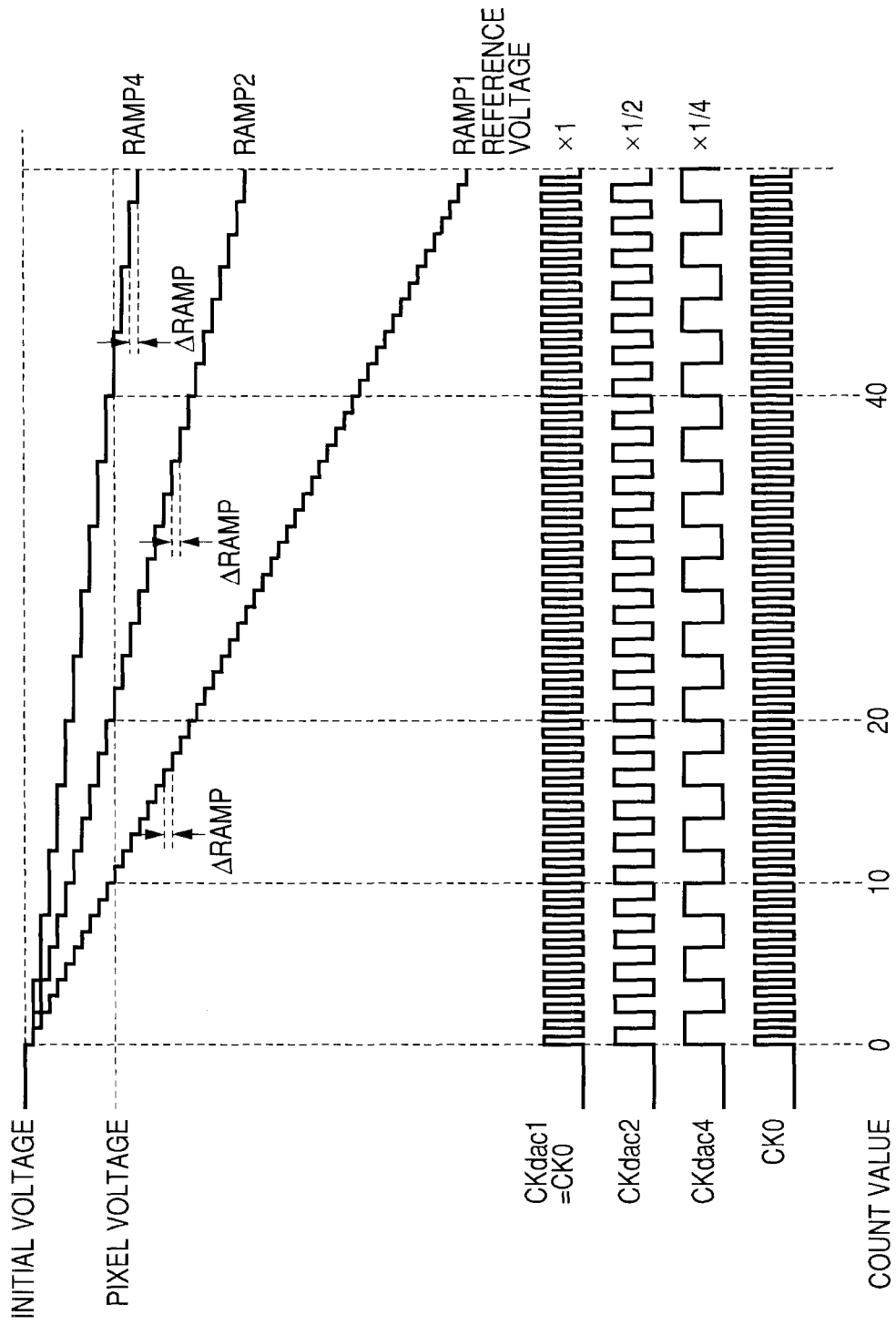
FIG. 3 is a diagram for illustrating the function of a DA converter of the imaging device of the embodiment.

Described first is a reference signal to be generated by the reference signal generation section 27. The reference signal generation section 27 generates such a ramp-shaped ramp voltage (reference signal) as shown in FIG. 3. Using information found in the control signal CN4 of directing the slope (rate of change) of the ramp voltage, the voltage change ΔRAMP is adjusted for every count clock CKdac. For such adjustment, the potential is calculated by y=α (initial value) −β*x where x denotes the counter output value, and β denotes the slope (rate of change) of the ramp voltage found in the control signal CN4 is output to the ramp voltage while keeping constant the cycle of the count clocks CKdaca and CKdacb for provision to the reference signal generation section 27, for example. Adjusting the slope of the ramp voltage, i.e., adjusting the slope β of the RAMP slope can be implemented by changing the amount of current of the unit current source, and by adjusting the voltage change ΔRAMP per clock. Alternatively, the voltage change ΔRAMP per clock may be adjusted by changing the number of clocks.

The technique of setting α (initial value) that can provide an offset, and β (coefficient) that can provide a slope is assumed as being corresponding to the circuit configuration that can generate a ramp waveform showing a gradual voltage change by every count clock of CKdaca and CKdacb. In an exemplary case where a circuit of generating the ramp waveform is configured by any of the constant current sources and the selection circuit of selecting any one of the constant current sources (one or more arbitrary number), any parameter such as α (initial value) that can provide an offset, and β (coefficient) that can provide a slope adjusts, using the constant current source, the current flowing into the constant current source.

When noise is applied to a reference signal, this noise appears in the resulting captured image as noise at the time of AD conversion. Therefore, in this embodiment, the reference signal generation section 27 is provided with a local voltage supply circuit, and control is so applied as to keep constant the standard reference voltage for the local voltage supply circuit to generate a reference signal, thereby suppressing the power supply voltage noise to the reference signal.

Figure 4:
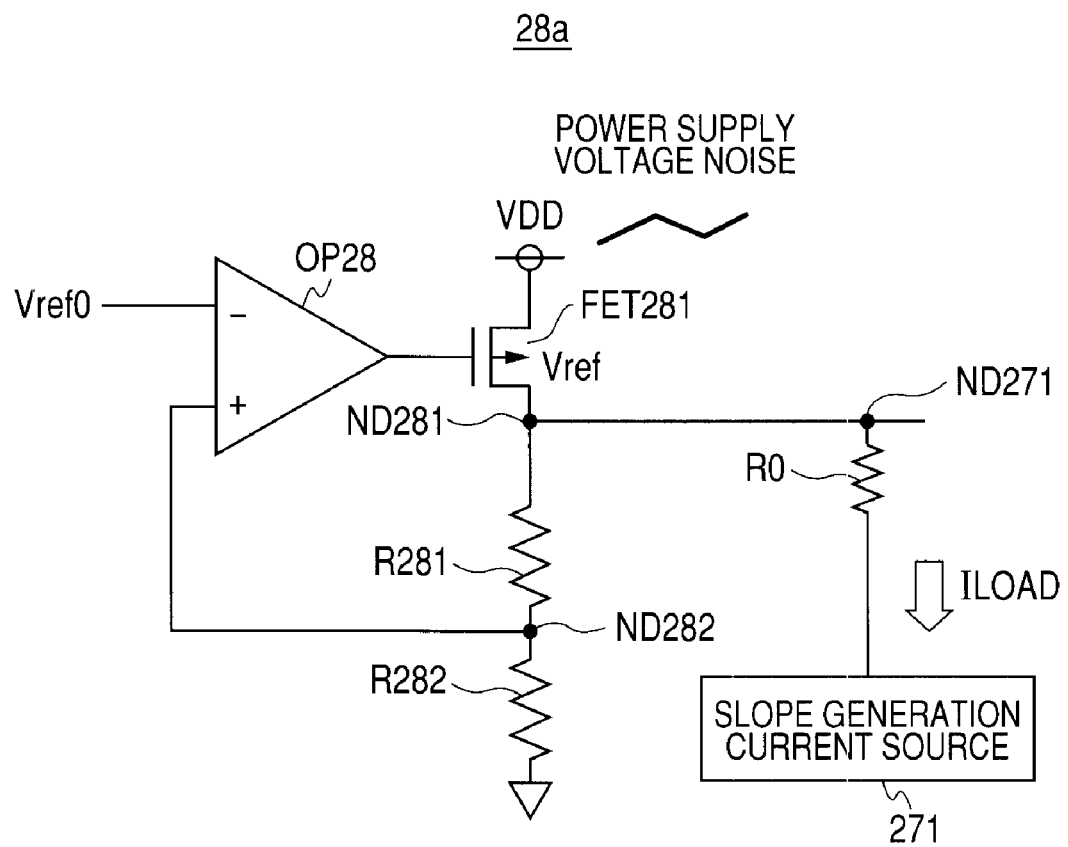
FIG. 4 is a circuit diagram showing an exemplary local voltage supply circuit of the embodiment.

Described next is the local voltage supply circuits 28a and 28b of the embodiment. The reference signal generation section 27 includes the local voltage supply circuit 28a of such a configuration as shown in FIG. 4. In the below, because the local voltage supply circuit 28b is of the same configuration as the local voltage supply circuit 28a, only the local voltage supply circuit 28a is described.

As shown in FIG. 4, the local voltage supply circuit 28a is configured to include an operational amplifier OP 28, a p-channel MOSFET 281 (in the below, referred to as FET 281), and resistances R 281 and R 282. In the operational amplifier OP 28, an output terminal is connected to the gate of the FET 281, a reverse input terminal is connected to any predetermined signal line, and a non-reverse input terminal is connected to the drain of the FET 281 via the resistance R 281. The source of the FET 281 is connected to a predetermined power supply potential line VDD. As to the resistances R 281 and R 282, one end of the resistance R 281 is connected to a node ND 281, and one end of the resistance R 282 is connected to a node ND 282. The local voltage supply circuit 28 is connected, via a node ND 271, to a slope generation current source 271 for generating the ramp voltage via a standard resistance R0.

Assuming here is that a predetermined reference voltage Vref0 (constant value) is input to the non-reverse input terminal of the operational amplifier OP 28, and the voltage (standard reference voltage) of the node ND 271 is increased by ΔVref. In this case, the node ND 281 is responsively increased in potential, and the local voltage supply circuit 28 is negatively fed back until a difference between the voltage of the node ND 281 and the reference voltage Vref0 becomes 0. Thereafter, the standard reference voltage Vref is corrected so as to make the drain current matching the voltage between the source and gate of the FET 281 flow through the node ND 281, and reduce the potential of the node ND 271 by the voltage increase of ΔVref.

As described above, the local voltage supply circuit 28a applies control in such a manner that the standard reference voltage Vref becomes constant in the operating state.

In this embodiment, for making constant the load current (drain current) of the local voltage supply circuit 28a flowing between the nodes ND 281 and ND 271, the slope generation current source 271 is provided with a path selection section for retaining constant the load current, and for reducing any noise to be generated in the reference signal RAMPa.

Figure 5:
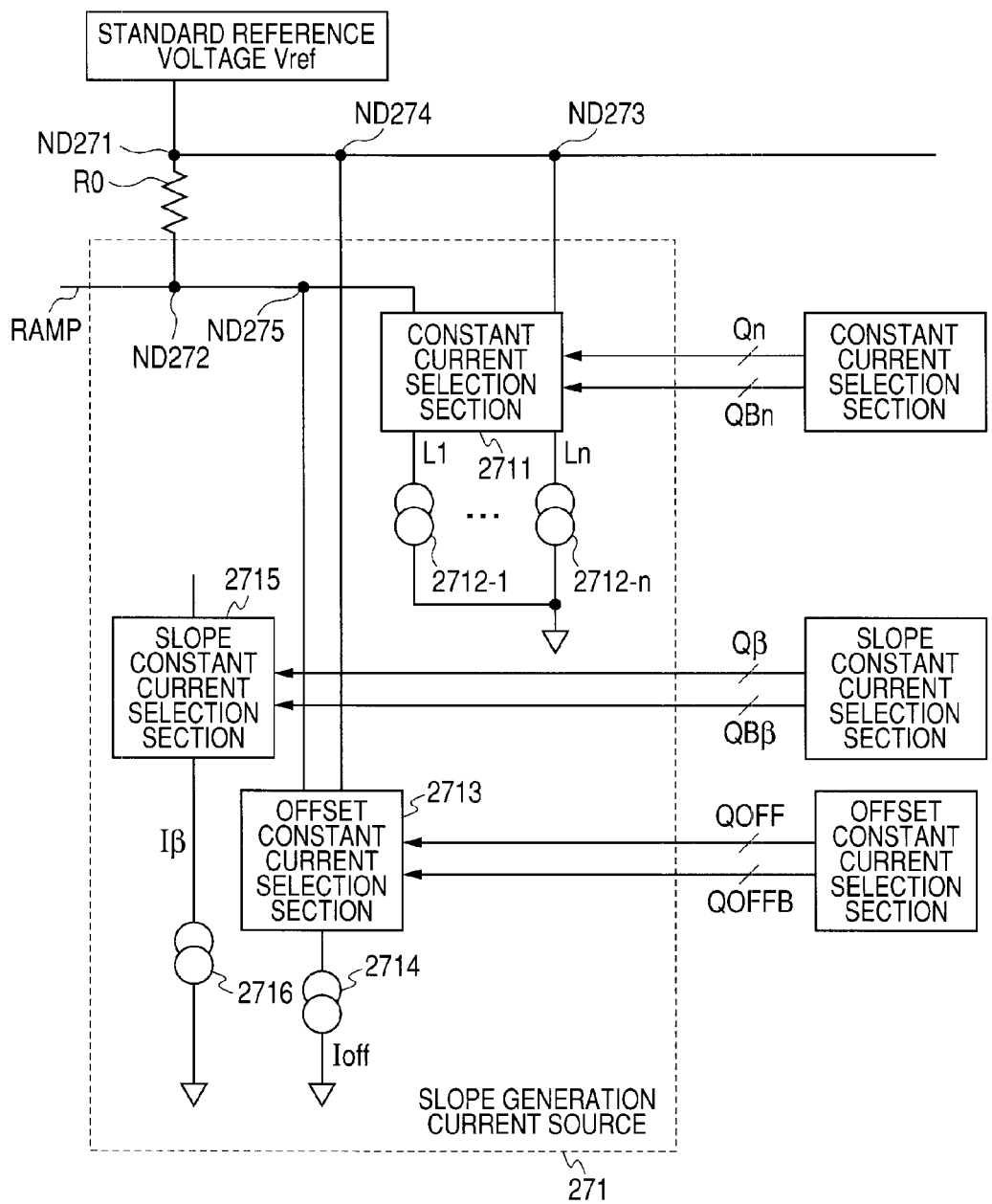
FIG. 5 is a block diagram showing an exemplary slope generation current source of the embodiment.

Described next is the slope generation current source 271. FIG. 5 is a diagram showing an exemplary configuration of the AD converter 27a provided to the reference signal generation section 27. Note that the AD conversion circuit 27b is of the same configuration as the AD conversion circuit 27a, and thus is not described.

As shown in FIG. 5, the DA converter 27a is configured to include the slope generation current source 271 and the standard resistance R0. The slope generation current source 271 is configured to include a constant current selection section 2711, constant current sources 2712-1 to 2712-n of n bits being the basis of a reference signal, an offset constant current selection section 2713, an offset constant current source 2714 determining α providing the offset, a slope constant current selection section 2715, and a slope constant current source 2716 determining β providing the slope of the ramp voltage.

The standard resistance R0 of the DA converter 27a is disposed between the node ND 271 and a node ND 272, and the constant current selection section 2711 is connected to both the node ND 272 and a node ND 273 to be parallel with the standard resistance R0. This constant current selection section 2711 is connected in parallel with the n-bit constant current sources 2712-1 to 2712-n. The offset constant current selection section 2713 is connected to nodes ND 274 and ND 275 in such a manner as to be parallel to the standard resistance R0, and also to the offset constant current source 2714. Moreover, the slope constant current selection section 2715 is connected with the slope constant current source 2716.

The selection sections of the slope generation current source 271, i.e., the constant current selection section 2711, the offset constant current selection section 2713, and the slope constant current selection section 2715, are defined by parameter (e.g., α providing an offset) of ramp voltage by the control applied to the current flowing to the constant current source connected to each of the selection sections. The selection sections are controlled by control signals Qn, QBn, Qβ, QBβ, QOff, and QOffB included in control data C4a provided by the communications/timing control section 20, for example.

Described next is the path selection section provided to each of the selection sections, i.e., the constant current selection section 2711, the offset constant current selection section 2713, and the slope constant current selection section 2715.

Figure 6:
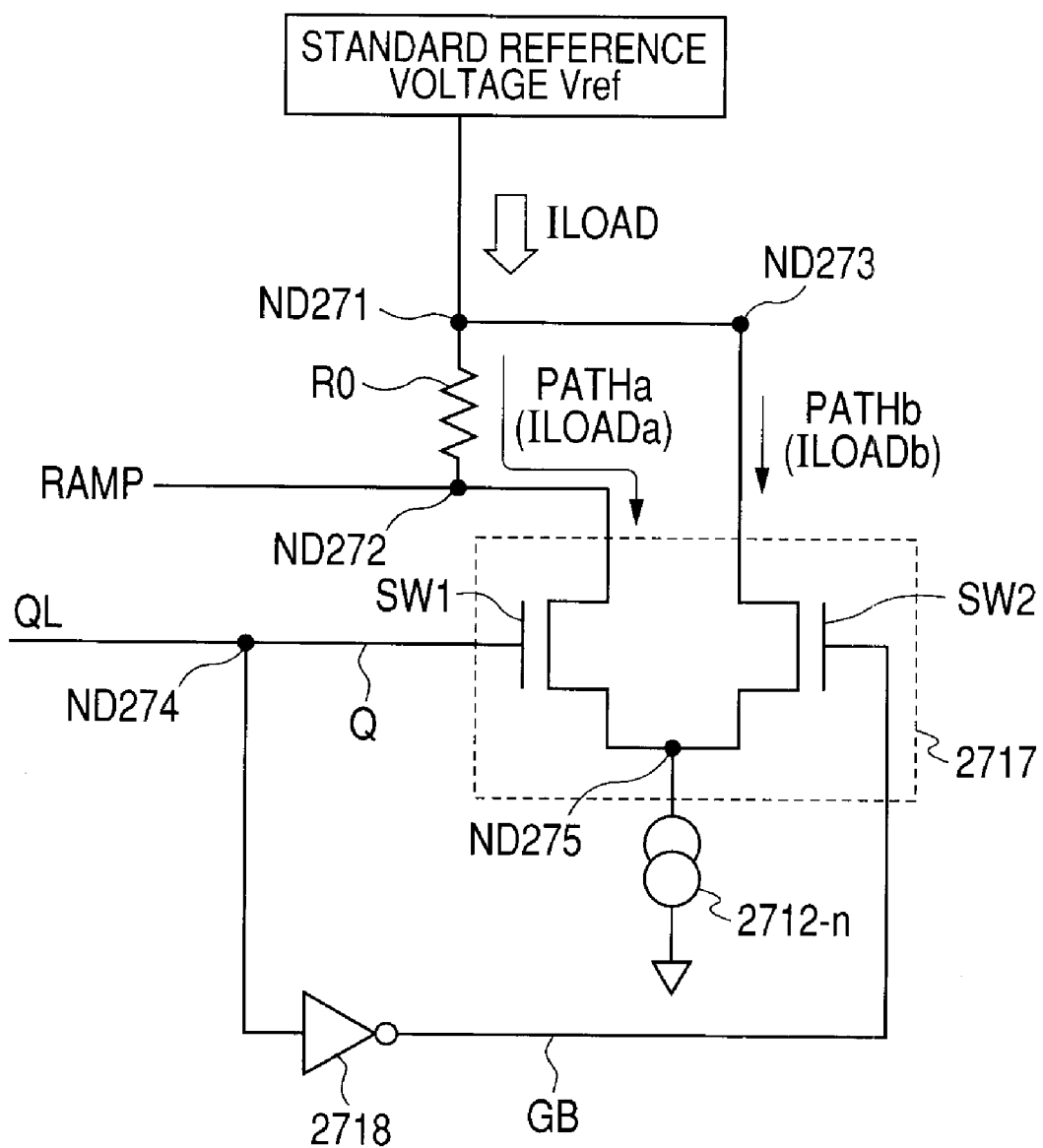
FIG. 6 is a block diagram showing an exemplary path selection section of the embodiment.

FIG. 6 is a diagram for illustrating a path selection section 2717. For the sake of simplicity, exemplified is a path of the constant current source 2712-1. The path selection section 2717 makes a path change for a load current ILOAD from the local voltage supply circuit 28 to flow, i.e., between a path PATHa from the node ND 271 to the standard resistance R0, and then to the constant current source 2712-n via the switch SW1 (corresponding to a first path of the embodiment in the invention), and a path PATHb from the node ND271 to the constant current source 2712-n via the node ND 273 and the switch SW2 (corresponding to a second path of the embodiment in the invention). Herein, the load current flowing to the path PATHa is referred to as ILOADa, and the load current flowing to the path PATHb is referred to as ILOADb. In actuality, the constant current sources are provided with such paths PATHa and PATHb as shown in FIG. 6 in each of the n-bit constant current sources.

In this embodiment, as an example, the switches SW1 and SW2 are each provided with an n-channel FET as a switching element. As shown in FIG. 6, in the FET of the switch SW1, the gate is connected to the node ND 274, the drain to the node ND 272, and the source to the node ND 275. In the FET of the switch SW2, the gate is connected to the output terminal of an inverter 2718, the drain to the node ND 273, and the source to the node ND 275.

When the signal line QL is applied with a high-level signal based on the control signal CN4a coming from the communications/timing control section 20, for example, the switch SW1 is turned on, and in the switch SW2, the signal line QB is turned off (state of non-conduction) by a low-level signal being a reverse result by the inverter 2718. At this time, the load current ILOAD is output to a predetermined output terminal after going through the path PATHa. When the signal line QL is applied with a low-level signal, the switch SW1 is turned off, and the switch SW2 is turned on by a high-level signal being a reverse result by the inverter 2718. At this time, the load current ILOAD is output to a predetermined output terminal after going through the path PATHb.

In accordance with the ramp voltage to be generated, one or more constant current source are selected. When the constant current source 2712-1 is selected by a control signal, the switch SW1 is turned on, and the path PATHa is selected. In each of the remaining constant current sources 2712-2 to 2712-$n$, the switch SW2 is turned on, and the path PATHb is selected. As such, in the selected current source in the slope generation current source 271, the switch SW1 is turned on, and the path PATHa is selected. In each of the remaining current sources not selected, the switch SW2 is turned on, and the path PATHb is selected so that the load current becomes constant in the operating state with respect to the local voltage supply circuit 28a.

Although not shown, the offset constant current selection section 2713 and the slope constant current selection section 2715 are also provided with the path selection section 2717 of the configuration same as the constant current selection section 2711, and the current load is made constant for application to the standard reference voltage Vref through path change made in accordance with the selected current source.

The reference signal RAMPa includes not only the power supply voltage noise but also the noise of the standard reference voltage Vref, the noise of the local voltage supply circuit 28 itself, or others. Such noise is dependent on the frequency characteristics of the local voltage supply circuit 28. As such, in the embodiment, the frequency characteristics of the local voltage supply circuit 28 are made to be of narrow band for the purpose of reducing the noise.

Figure 7:
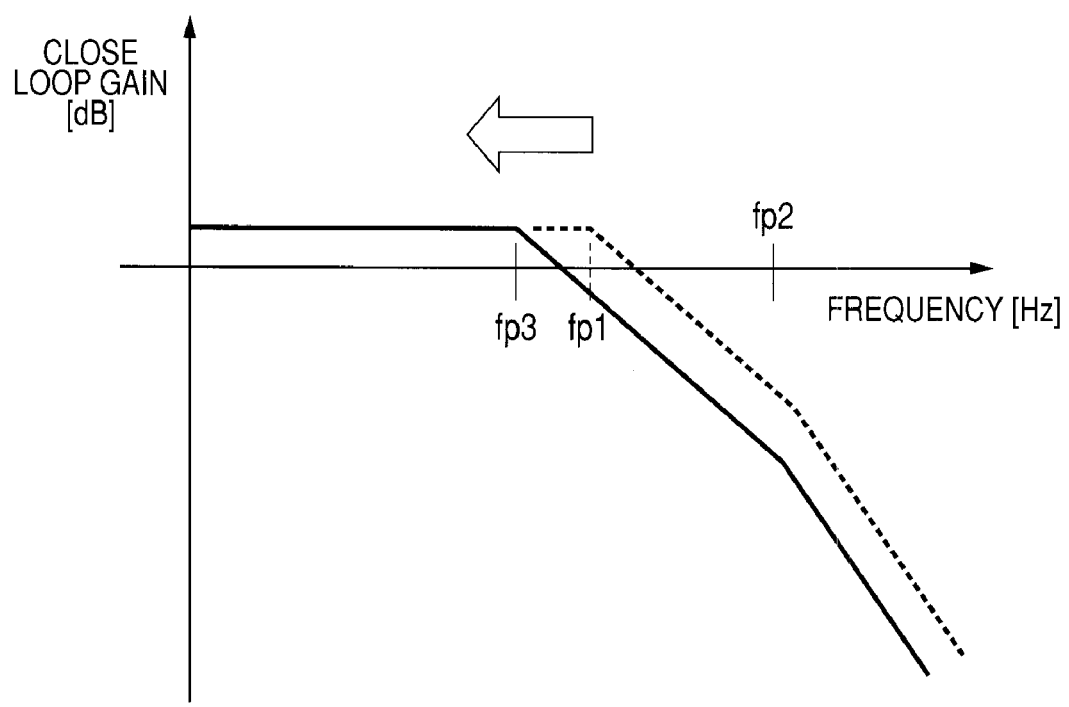
FIG. 7 is a bode diagram showing exemplary closed loop characteristics of the local voltage supply circuit of the embodiment.

The bode diagram of FIG. 7 shows the closed loop characteristics of the local voltage supply circuit 28. In FIG. 7, the lateral axis indicates the frequency of the local voltage supply circuit 28, and the vertical axis indicates the gain of the closed loop. As shown in FIG. 7, the closed loop characteristics of the local voltage supply circuit 28 have two poles fp1 and fp2, and the pole fp1 of a predetermined frequency is moved to a pole fp3 of a frequency lower than that of the pole fp1.

In this embodiment, the pole fp1 is moved to the pole fp3 of a lower frequency, and the local voltage supply circuit 28 is reduced in bandwidth thereby so that the noise components in the circuit are reduced. Because the local voltage supply circuit 28 has the constant load current in this configuration, the load excess response characteristics are not deteriorated even if the local voltage supply circuit 28 is reduced in bandwidth. The bandwidth-reduction can be realized using the capacity for phase compensation or any external capacity. For such bandwidth-reduction, the pole fp2 may be moved to an area of lower frequency. Alternatively, the poles fp1 and fp2 may be both moved to an area of lower frequency.

In this configuration, as such, the selection sections of the slope generation current source 271, i.e., the constant current selection section 2711, the offset constant current selection section 2713, and the slope constant current selection section 2715, are each provided with the path selection section 2717 for a path change in accordance with the load current so that any possible variation of the load current can be reduced. Moreover, by reducing the bandwidth of the frequency of the local voltage supply circuit 28a, the reference signal generation section 27 becomes able to generate the ramp voltage being stable with no noise.

Figure 8:
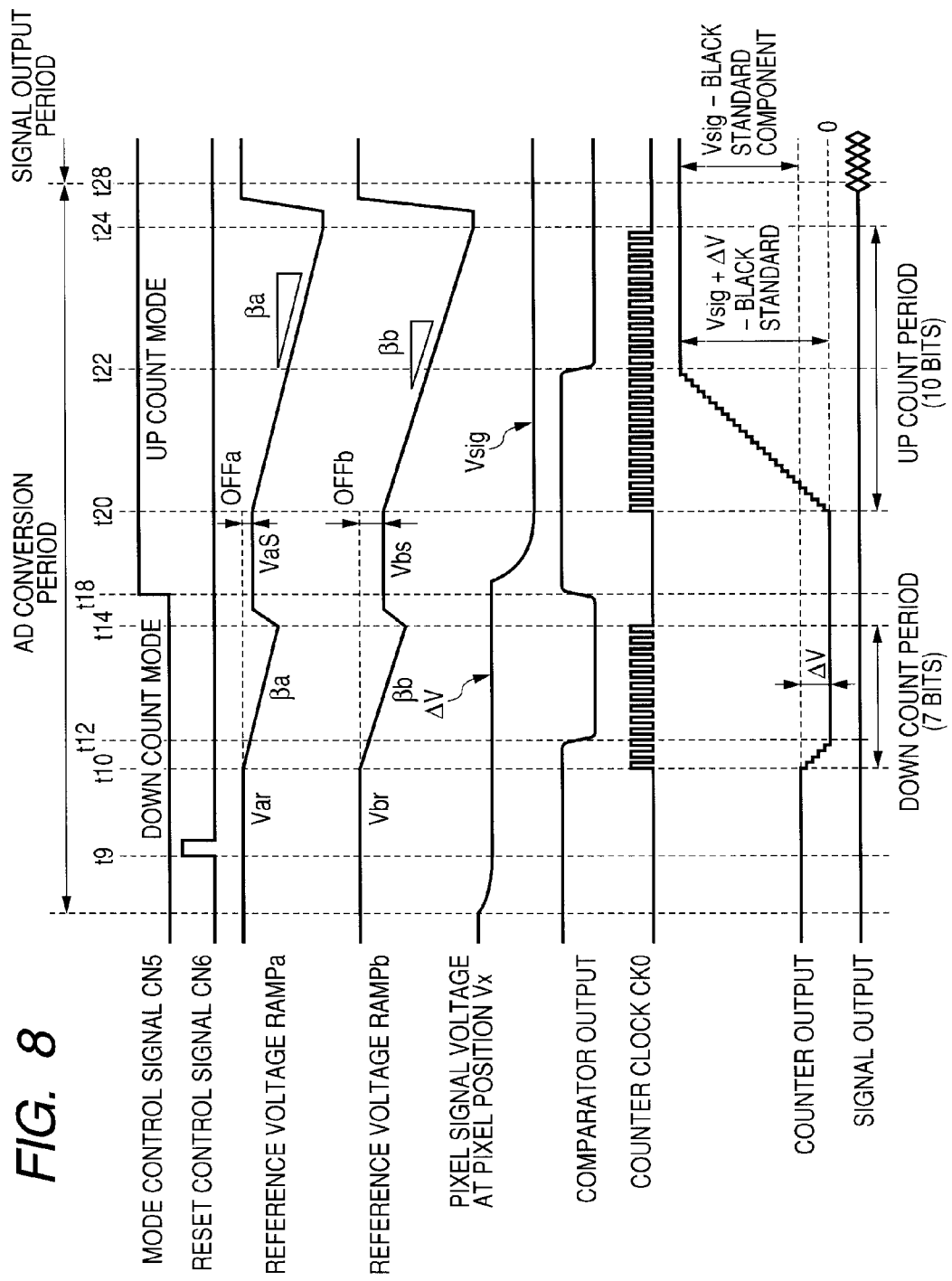
FIG. 8 is a timing chart for illustrating a signal gain differential process being the basic operation in a column AD circuit in the imaging device of the embodiment.

FIG. 8 is a timing chart for illustrating the signal gain differential process being the basic operation in the column AD circuit 25 of the imaging device 1 of the embodiment.

As a mechanism of converting an analog pixel signal detected by the unit pixels 3 of the pixel section 10 into a digital signal, for example, a search is made for a point where the reference signal RAMP of a ramp waveform showing the downward slope with a predetermined slope coincides with the voltage of the standard component and that of the signal component in a pixel signal from the unit pixel 3. Thereafter, a count clock is used to count (time-count) the time from the point in time when the reference signal RAMP is generated for use in the comparison process to the point in time when the coincidence is derived between the electric signal and the reference signal corresponding to the reference component and the signal component in the pixel signal, thereby acquiring the count value matching the size of the reference component and that of the signal component.

Herein, in the pixel signal coming from the vertical signal line 19, a signal component Vsig appears as a time series after a reset component $\Delta V$ including a noise of the pixel signal being a standard component. When the processing is performed for the first time for the reference component, i.e., reset component $\Delta V$, the processing for the second time will be for a signal as a result of adding the signal component Vsig to the standard component, i.e., the reset component $\Delta V$. In the below, this is described in more detail.

For reading for the first time, first of all, the communications/timing control section 20 sets a mode control signal CN5 to a low level, and sets the counter section 254 to the down-count mode. The communications/timing section 20 also activates a reset control signal CN6 for a predetermined length of time (e.g., high level in this example) to reset the count value of the counter section 254 to an initial value "0" (t9). After the reading for the first time from the unit pixels 3 of any arbitrary line Hx to the vertical signal lines 19 (V0, V1, . . . ) is stabilized, the communications/timing control section 20 supplies, toward the reference signal generation section 27, the control signals CN4$a$ and CN4$b$ for use to generate the reference signals RAMPa and RAMPb.

In response thereto, in the reference signal generation section 27, first of all, the DA converter 27$a$ generates the reference signal RAMPa with a slope βa matching the color pixel characteristics of one color (R or G on odd lines) found on the line Hx, and with the stair-step-shaped waveform (RAMP waveform) as a result of the entire change into the shape of sawtooth (RAMP shape) overtime. The resulting reference signal RAMPa is forwarded, as the comparison voltage, to one input terminal RAMP of the voltage comparison section 252 of each of the column AD circuits 25 corresponding to the odd lines.

Similarly, the DA converter 27$b$ generates the reference signal RAMPb with a slope Pb matching the color pixel characteristics of the remaining color (G or B on even lines) found on the line Hx, and with the stair-step-shaped waveform (RAMP waveform) as a result of the entire change into the shape of sawtooth (RAMP shape) over time. The resulting reference signal RAMPb is forwarded, as the comparison voltage, to the remaining input terminal RAMP of the voltage comparison section 252 of each of the column AD circuits 25 corresponding to the even lines.

The voltage comparison section 252 compares the comparison voltage of RAMP waveform with the pixel signal voltage of any arbitrary vertical signal line (Vx) 19 coming from the pixel section 10.

At the same time when the reference signals RAMPa and RAMPb are input to the input terminal RAMP of the voltage comparison section 252, a count clock CK0 is also input to the clock terminal of the counter section 254 from the communications/timing control section 20, and the down-counting is started from the initial value "0" as the count operation for the first time, i.e., the counting process is started in the negative direction. This clock input is made in synchronization with the ramp waveform voltage generated by the reference signal generation section 27 for counting the time taken to the comparison in the voltage comparison section 252 using the counter section 254 provided to every line.

The voltage comparison section 252 compares the ramp-shaped reference signal RAMP from the reference signal generation section 27 and the pixel signal voltage Vx provided over the vertical signal line 19. When the same level of voltage is derived therefor, the comparator output is reversed from high to low in level (t12). That is, a comparison is made between the voltage signal matching the reset component Vrst and the reference signal RAMP, and after the lapse of time corresponding to the size of the reset component Vrst, a low-level pulse signal is generated for supply to the counter section 254.

In response thereto, the counter section 254 stops its count operation almost at the same time when the comparator output is reversed, and latches (retains and stores) the count value at the point in time as pixel data so that the AD conversion is completed (t12). That is, the down-counting is started when the ramp-shaped reference signal RAMP is being generated for supply to the voltage comparison section 252, and the counting is continued using a count clock CK0 until a low-level pulse signal is derived by the comparison process so that the resulting count value matches the size of the reset component Vrst.

After the lapse of a predetermined down-count period (t14), the communications/timing control section 20 stops the supply of control data to the voltage comparison section 252 and the supply of a count clock CK0 to the counter section 254. In response thereto, the voltage comparison section 252 stops generation of the ramp-shaped reference signal RAMP.

In this reading for the first time, the reset component Vrst in the pixel signal voltage Vx is detected by the voltage comparison section 252 for the count operation. It means that the reset component ΔV of the unit pixel 3 is being read.

The reset component ΔV is including a noise varying among the unit pixels 3 as an offset. This variation of the reset component ΔV is generally small, and the reset component Vrst is almost the same among the pixels. As such, the output value of the reset component ΔV is almost known in the pixel signal voltage Vx of any arbitrary vertical signal line 19.

As such, at the time of reading of the reset component ΔV for the first time, adjusting the ramp voltage with the slope βa or the slope βb can reduce the down-count period (t10 to t14; comparison period). In this embodiment, the longest period for the comparison process of the reset component ΔV is set to a count period of 7 bits (128 clocks) for comparison of the reset components ΔV.

At the time of reading for the second time, in addition to the reset component ΔV, the signal component Vsig corresponding to the amount of incoming light is read for every unit pixel 3, and the operation is executed similarly to the reading for the first time. That is, first of all, the communications/timing control section 20 sets the mode control signal CN5 to a high level, and sets the counter section 254 to the up-count mode (t18). After the reading for the second time from the unit pixels 3 of any arbitrary line Hx to the vertical signal lines 19 (V0, V1, ...) is stabilized, the communications/timing control section 20 supplies, to the DA converter 27a, the control signal CN4a (including the offset OFFa and the slope βa in this example) for generation use of the reference signal RAMPa for the AD conversion process of the signal component Vsig. The communications/timing control section 20 also supplies, to the DA converter 27b, the control signal CN4b (including the offset OFFb and the slope βa, and a path-change signal of the path selection section in this example) for generation use of the reference signal RAMPb.

As a result of such a sequence of operations, in the reference signal generation section 27, the components, i.e., the constant current selection section 2711, the offset constant current selection section 2713, and the slope constant current selection section 2715, are so controlled that the load current ILOAD is made constant.

In the reference signal generation section 27, the DA converter 27a generates the reference signal RAMPa with a slope βa matching the color pixel characteristics of one color (R or G on odd lines) found on the line Hx, and with the stair-step-shaped waveform (RAMP waveform) as a result of the entire change into the shape of sawtooth (RAMP shape) over time. In the resulting reference signal RAMPa, the voltage thereof is lower by the offset OFFa compared with the initial voltage Var for the reset component ΔV, and is forwarded, as the comparison voltage, to one input terminal RAMP of the voltage comparison section 252 of each of the column AD circuits 25 corresponding to the odd lines.

Similarly, the DA converter 27b generates the reference signal RAMPb with a slope βb matching the color pixel characteristics of the remaining color (G or B on even lines) found on the line Hx, and with the stair-step-shaped waveform (RAMP waveform) as a result of the entire change into the shape of sawtooth (RAMP shape) overtime. In the resulting reference signal RAMPb, the voltage thereof is lower by the offset OFFb compared with the initial voltage Vbr for the reset component ΔV, and is forwarded, as the comparison voltage, to the remaining input terminal RAMP of the voltage comparison section 252 of each of the column AD circuits 25 corresponding to the even lines.

The voltage comparison section 252 then compares the comparison voltage of RAMP waveform with the pixel signal voltage of any arbitrary vertical signal line 19 (Vx) coming from the pixel section 10.

As described above, the initial voltages of the reference voltages at this time are those calculated based on the signal derived from a plurality of arbitrary pixels generating black standard. As such, the initial voltages each have a different value (offset OFFa and offset OFFb) including a variation component uniquely generated by the reference signal RAMPa generated by the DA converter 27a and the reference signal RAMPb generated by the DA converter 27b. The initial voltage of the reference voltage may include any arbitrary offset other than the signal derived by the pixels generating black standard.

At the same time when the reference signals RAMPa and RAMPb are input to the input terminal RAMP of the voltage comparison section 252, a count clock CK0 is input to the clock terminal of the counter section 254 from the communications/timing control section 20, and as the count operation for the second time, the up-counting is started in the reverse direction in the reading for the first time, starting from the count value corresponding to the reset component ΔV of the unit pixel 3 acquired in the reading for the first time, i.e., the counting process is started in the positive direction. This clock input is made in synchronization with the ramp waveform voltage generated by the reference signal generation section 27 for counting the time taken to the comparison in the voltage comparison section 252 using the counter section 254 provided to every line (t20).

The voltage comparison section 252 compares the ramp-shaped reference signal RAMP from the reference signal generation section 27 and the pixel signal voltage Vx provided over the vertical signal line 19. When the same level of voltage is derived therefor, the comparator output is reversed from high to low in level (t22). That is, a comparison is made between the voltage signal matching the signal component Vsig and the reference signal RAMP, and after the lapse of time corresponding to the size of the signal component Vsig, a low-level pulse signal is generated for supply to the counter section 254.

In response thereto, the counter section 254 stops its count operation almost at the same time when the comparator output is reversed, and latches the count value at the point in time as pixel data so that the AD conversion is completed (t22). That is, the up-counting is started when the ramp-shaped reference signal RAMP is being generated for supply to the voltage comparison section 252, and the counting is continued using a count clock CK0 until a low-level pulse signal is derived by the comparison process so that the resulting count value matches the size of the signal component Vsig.

After the lapse of a predetermined up-count period (t24), the communications/timing control section 20 stops the supply of control data to the voltage comparison section 252 and the supply of a count clock CK0 to the counter section 254. In response thereto, the voltage comparison section 252 stops generation of the ramp-shaped reference signal RAMP.

In this reading for the second time, the signal component Vsig in the pixel signal voltage Vx is detected by the voltage comparison section 252 for the count operation. It means that the signal component Vsig of the unit pixel 3 is being read.

In the embodiment, the count operation in the counter section 254 is performed with down counting for the reading for the first time, and with up counting for the reading for the second time. As such, in the counter section 254, such a subtraction as Equation 1 is automatically performed, and the resulting count value as a result of the subtraction is stored in the counter section 254.

(Count Value in Second Comparison Period)−(Count Value in First Comparison period) Equation 1

Equation 1 can be modified as Equation 2, and as a result, the count value to be stored in the counter section 254 will be corresponding to the signal component Vsig.

(Second Comparison Period)−(First Comparison period)=((Signal Component $Vsig$)+(Reset Component $\Delta V$)+(Offset Component of Column AD circuit 25)−(Black Standard Component))−(Reset Component $\Delta V$)+(Offset Component of Column AD circuit 25)=(Signal Component $Vsig$)−(Black Standard Component) Equation 2

That is, as described above, by the subtraction processing in the counter section 254 with reading of twice and the count process, i.e., the down-counting in the reading for the first time and the up-counting in the reading for the second time, it becomes possible to eliminate the reset component $\Delta V$ including variations among the unit pixels 3, and the offset components of each of the column AD circuits 25. This accordingly enables to extract only digital data of a signal being a result of correcting, with a black standard component, the signal component Vsig matching the amount of incoming light of each of the unit pixels 3 with a simple configuration. At the time of data extraction as such, any circuit variation and reset noise can be also eliminated.

As such, the column AD circuit 25 of the embodiment serves not only the analog digital converter for converting an analog pixel signal into digital pixel data but also as a CDS (Correlated Double Sampling) processing function section.

Moreover, because the pixel data indicated by the count value as a result of Equation 2 indicates a positive signal voltage, this eliminates the need for a complement operation, thereby showing a high affinity for any existing system.

Herein, at the time of reading for the second time, the signal component Vsig matching the amount of incoming light is to be read. Accordingly, to determine the size of amount of light with a wider range, the up-counting period (t20 to t24; comparison period) is required to be set long, and the ramp voltage for supply to the voltage comparison section 252 is required to be largely changed.

In consideration thereof, the longest period for a comparison process of the signal component Vsig is set to a 10-bit count period (1024 clocks) for comparison of the signal components Vsig. That is, the longest period for the comparison process of the reset component $\Delta V$ (reference component) is set shorter than the longest period for the comparison process of the signal component Vsig. As such, instead of making the same the longest period for the comparison process of the reset component $\Delta V$ (reference component) as that of the signal component Vsig, i.e., instead of making the same the maximum values for the AD conversion period, the longest period for the comparison process of the reset component $\Delta V$ (reference component) is set shorter than the longest period for the comparison process of the signal component Vsig so that the AD conversion period of twice is made shorter in total.

If this is the case, although the number of bits for comparison use in the reading for the first time is not the same as that in the reading for the second time, the communications/timing control section 20 provides control data to the reference signal generation section 27, and based on the control data, the reference signal generation section 27 generates the ramp voltage. In this manner, the slope of the ramp voltage, i.e., the rate of change of the reference signal RAMP, is made the same in the reading of twice. The slope of the ramp voltage is made the same in the reading of twice as such because the ramp voltage is generated by digital control. As such, the AD conversion can be performed always with the same accuracy, the result of subtraction of Equation 1 using an up-down counter can be correct.

At a predetermined timing after the count process for the second time is completed (t28), the communications/timing control section 20 issues a command to the horizontal scanning circuit 12 of reading the pixel data. In response thereto, the horizontal scanning circuit 12 sequentially shifts the horizontal selection signal CH(i) for supply to the counting section 254 over the control line 12c.

As a result, the count value indicated by Equation 2 and stored and retained in the counter section 254, i.e., the pixel data represented by the digital data of n bits, is output from the output terminal 5c to the outside of the column processing section 26 or the outside of the chip including the pixel section 10 over the n pieces of horizontal signal lines 18. Thereafter, such an operation is repeated sequentially for every line so that the video data D1 representing a two-dimensional image is derived.

Second Exemplary Configuration of Reference Signal Generation Section 27

Described next is a second exemplary configuration of the reference signal generation section 27.

In this configuration, the offset OFFa of a ramp voltage is adjusted inside of a local voltage supply circuit using a variable resistance, and the slope βa of the ramp voltage is adjusted also using the variable resistance.

Figure 9:
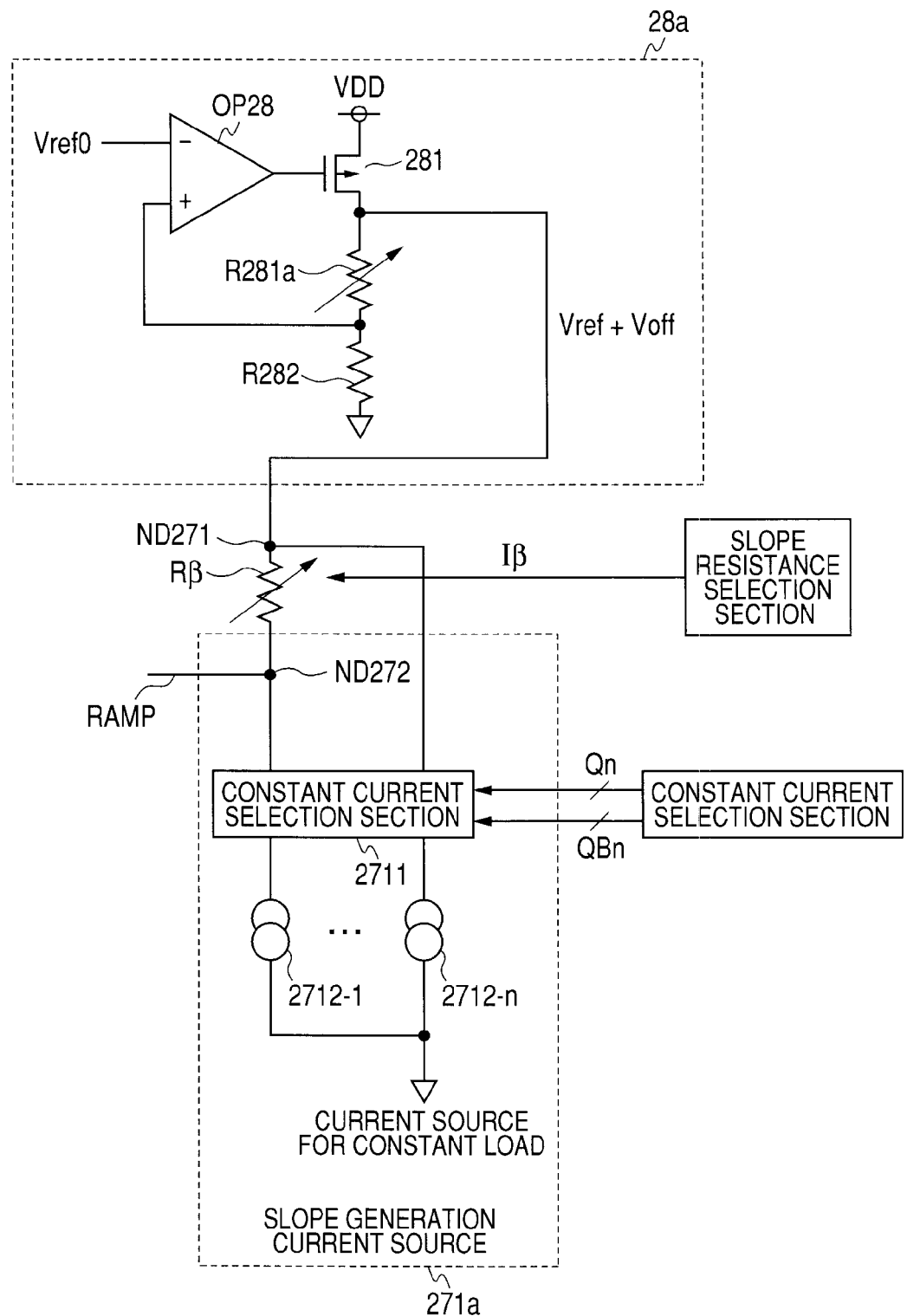
FIG. 9 is a block diagram showing a second exemplary configuration of a reference signal generation section of the embodiment.

FIG. 9 is a diagram showing another exemplary configuration of the reference signal generation section 27 of the embodiment.

As shown in FIG. 9, the reference signal generation section 27 is configured to include a slope generation current source 271a, a variable standard resistance Rβ, and the local voltage supply circuit 28a. Note here that the local voltage supply circuit 28b is of the same configuration as the local voltage supply circuit 28a, and thus is not described.

In the slope generation current source 271a, the constant current selection section 2711 is connected to the constant current sources 2712-1 to 2712-n of n bits being the basis of a reference signal. In the local voltage supply circuit 28a, a variable resistance R 281a is provided as an alternative to the resistance R 281 in the first exemplary configuration. The local voltage supply circuit 28a configured as such is connected to the node ND 271. Moreover, the constant current selection section 2711 is connected to both the node ND 271 and the node ND 272 so as to be in parallel with the variable standard resistance Rβ connected between the nodes ND 271 and ND 272.

The constant current selection section 2711 is controlled in terms of flowing current by a control signal Qn included in the control data C4a provided by the communications/timing control section 20, for example, so that the ramp voltage is determined.

To be more specific, the offset OFFa is adjusted by changing the variable resistance R 281a. Alternatively, the resistance R 282 in the first exemplary configuration may be replaced with a variable resistance to change the variable resistance as in this exemplary configuration. Still alternatively, the offset OFFa may be adjusted by changing the reference voltage Vref0.

For adjusting the slope β of the ramp voltage, changing the variable standard resistance Rβ will do. When the angle of the slope β of the ramp voltage is to be reduced, reducing the resistance value of the variable standard resistance Rβ will change the angle of the slope β of the ramp voltage even with the same current value.

The constant current selection section 2711 is provided with the path selection section 2717 as in the first exemplary configuration, and changes the path for the current depending on the load of the local voltage supply circuit 28a.

This thus enables to reduce the bandwidth for the local voltage supply circuit 28a, thereby leading to the effects similar to those achieved by the first exemplary configuration.

Moreover, in this exemplary configuration, the offset OFFa of the ramp voltage is adjusted by the variable resistance R 281a inside of the local voltage supply circuit 28a, and the slope β thereof is adjusted by the variable standard resistance Rβ. As such, the layout area can be reduced, and the power consumption can be also reduced in the circuit.

Figure 10:
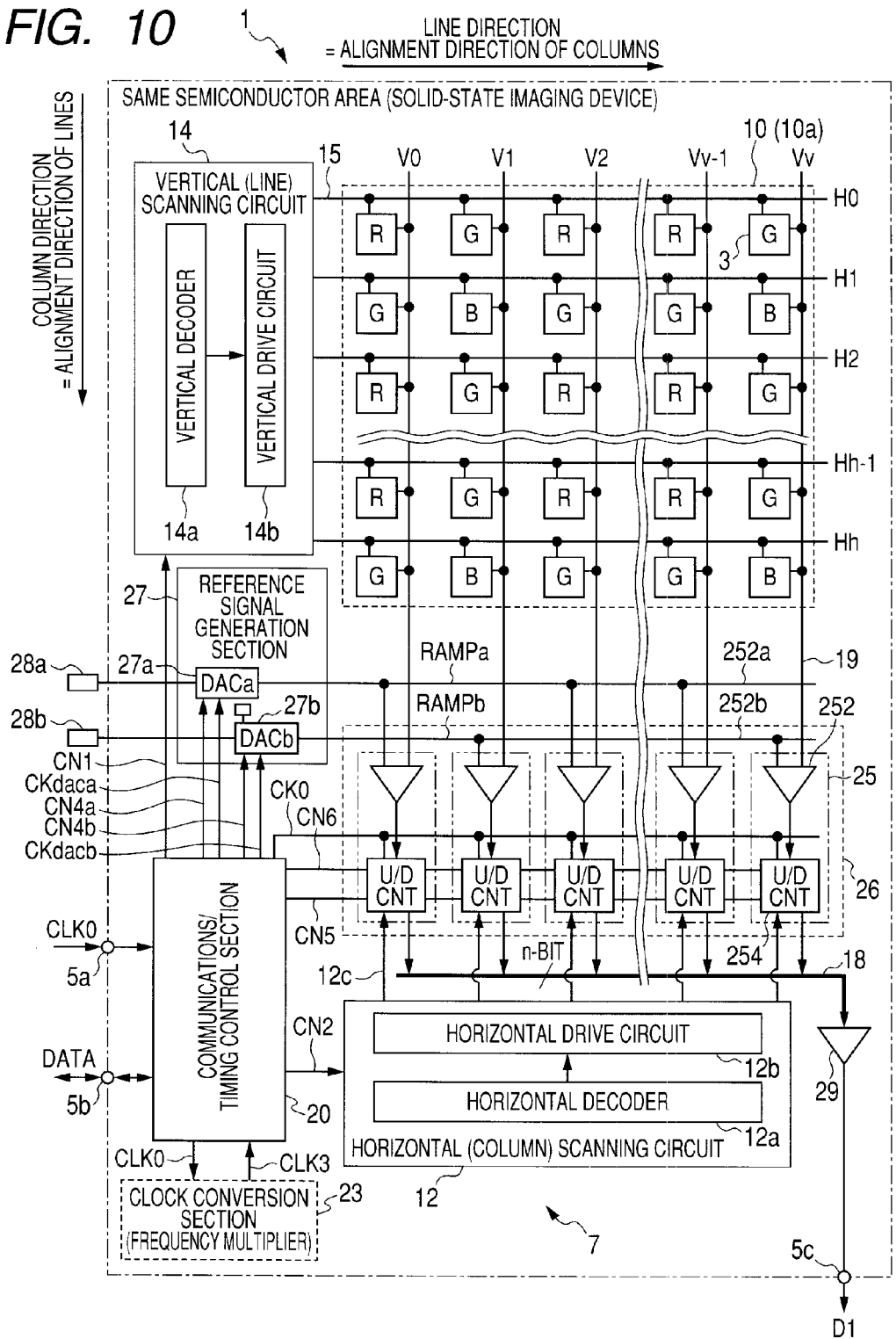
FIG. 10 is a circuit diagram showing a placement example of the local voltage supply circuit of the embodiment.

As shown in FIG. 10, the local voltage supply circuits 28a and 28b of the first and second exemplary configurations may be disposed outside of the reference signal generation section 27. For example, the local voltage supply circuit 28 may be disposed outside of the imaging device 1, and if with such a configuration, the effects similar to those achieved by the first and second exemplary configurations can be derived.

Figure 11:
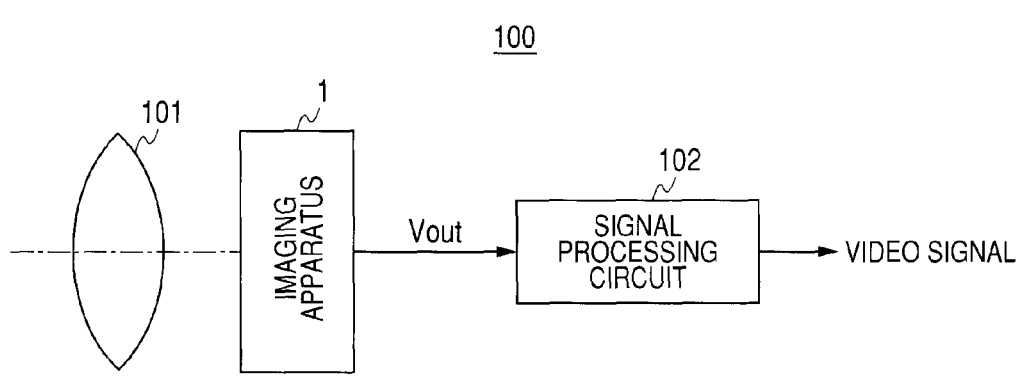
FIG. 11 is a diagram showing an exemplary configuration of a camera of the embodiment.
Figure 12:
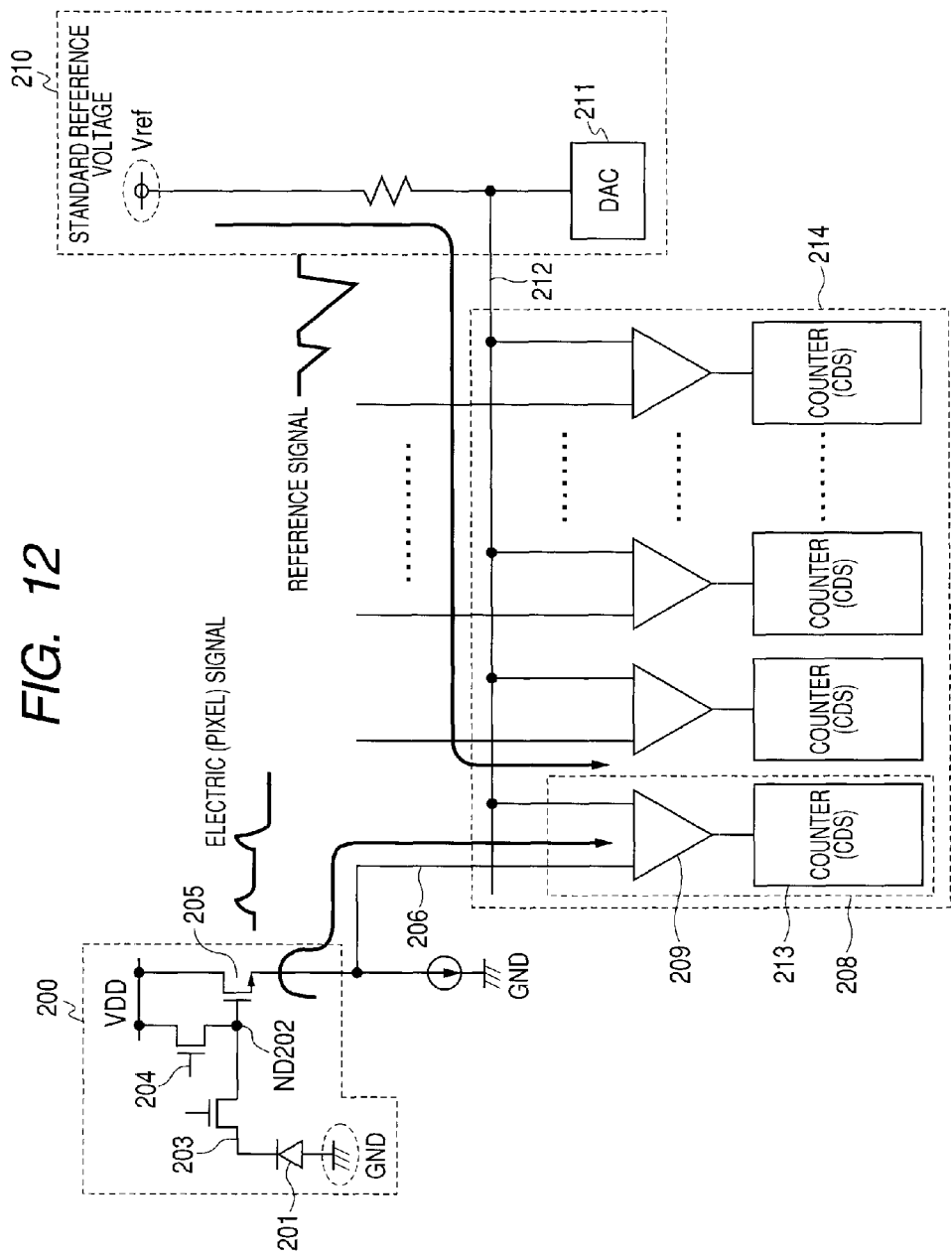
FIG. 12 is a block diagram for illustrating the outline of the operation of a column processing circuit.

Described next is a camera of the embodiment of the invention. FIG. 11 is a block diagram schematically showing the camera of the embodiment of the invention.

As shown in FIG. 11, this camera 100 is configured to include the imaging device 1, an optical system that guides an incoming light to the pixel section 10 of the imaging device 1, e.g., a lens 101 forming an image by an incoming light (image light) on an imaging surface, a signal processing circuit 102 for processing an output signal of the imaging device 1, and others.

In this camera 100, the imaging device 1 is the imaging device of the embodiment. The signal processing circuit 102 outputs a video signal by applying various types of signal processing to an output signal Vout, e.g., video data D1, from the output terminal 5c of the imaging device 1.

With such a camera, by using the imaging device 1 of the embodiment described above, the resulting image can be of high image quality with less noise.

Note here that the imaging device 1 of the embodiment of the invention may be formed as a chip or of a module type formed as a collection of a plurality of chips. If with an imaging device formed as a collection of a plurality of chips may include a sensor chip in charge of imaging, a signal processing chip in charge of digital signal processing, and others, and an optical system may be also included.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
   a unit pixel that outputs an analog electric signal in accordance with a signal charge generated the unit pixel;
   a reference signal generation section that generates a reference signal used for conversion of the analog electric signal output from the unit pixel into a digital signal;
   a local voltage supply circuit that generates a local voltage different from an operation voltage, the local voltage being provided to the reference signal generation section, and the reference signal generation section, based on the local voltage from the local voltage supply circuit, generating the reference signal for the conversion of the analog electric signal output from the unit pixel into the digital signal; and
   a processing section that receives the reference signal from the reference signal generation section and converts, by referring to the reference signal generated by the reference signal generation section, the analog electric signal output from the unit pixel into the digital signal,
   wherein,
   in an operating state, the reference signal generation section keeps a load current of the local voltage supply circuit constant.

2. The imaging device according to claim 1, wherein the local voltage supply circuit has a narrow band frequency characteristic.

3. The imaging device according to claim 2, wherein the local voltage comes from an outside of the reference signal generation section.

4. The imaging device according to claim 1, wherein the reference signal generation section includes:
   (i) a resistance,
   (ii) a plurality of constant current sources that determine a parameter of the reference signal, and
   (iii) a path selection section that changes a path of the load current flowing into each of the constant current sources to first and second paths,
   wherein,
   the constant current sources (a) are connected in parallel to the resistance connected to the local voltage supply circuit, (b) form the first path through which the load current flows thereinto from the local voltage supply circuit to the constant current sources via the resistance, and (c) form the second path through which the load current flows thereinto from the local voltage supply circuit to the constant current sources, and in the operating state, the path selection section performs a path change to the first or second path to make the load current of the local voltage supply circuit constant.

5. The imaging device according to claim 4, wherein:
the local voltage supply circuit includes a first variable resistance that can be changed in resistance value,
the resistance in the reference signal generation section is a second variable resistance that can be changed in resistance value, and
the first variable resistance and the second variable resistance have respective resistance values to adjust the parameter of the reference signal and to keep a consumption current of the reference signal generation section constant in the operating state.

6. An imaging device comprising:
an effective area including a charge generation section that generates a charge corresponding to an incoming electromagnetic wave, and a matrix array of unit pixels, a unit pixel outputting an analog electric signal in accordance with the charge generated by the charge generation section;
a reference signal generation section that generates a reference signal used for conversion of the analog electric signal output from the unit pixel into a digital signal;
a local voltage supply circuit that generates a local voltage different from an operation voltage, the local voltage being provided to the reference signal generation section, and the reference signal generation section, based on the local voltage from the local voltage supply circuit, generating the reference signal for the conversion of the analog electric signal output from the unit pixel into a digital signal; and
a processing section that receives the reference signal from the reference signal generation section and converts, by referring to the reference signal generated by the reference signal generation section, the analog electric signal output from the unit pixel into the digital signal,
wherein,
in an operating state, the reference signal generation section keeps a load current of the local voltage supply circuit constant.

7. A camera comprising:
an imaging device;
an optical system that guides an incoming light toward a pixel section of the imaging device; and
a signal processing circuit that processes an output signal of the imaging device,
wherein,
the imaging device includes (a) a unit pixel that outputs an analog electric signal in accordance with a signal charge generated by the unit pixel, (b) a reference signal generation section that generates a reference signal used for conversion of the analog electric signal output from the unit pixel into a digital signal, (c) a local voltage supply circuit that generates a local voltage different from an operation voltage, the local voltage being provided to the reference signal generation section, and the reference signal generation section, based on the local voltage from the local voltage supply circuit, generating the reference signal for the conversion of the analog electric signal output from the unit pixel into the digital signal, and (d) a processing section that receives the reference signal from the reference signal generation section and converts, by referring to the reference signal generated by the reference signal generation section, the analog electric signal output from the unit pixel into the digital signal, and
in an operating state, the reference signal generation section keeps a load current of the local voltage supply circuit constant.

8. A camera comprising:
an imaging device;
an optical system that guides an incoming light toward a pixel section of the imaging device; and
a signal processing circuit that processes an output signal of the imaging device,
wherein,
the imaging device includes (a) an effective area including a charge generation section that generates a charge corresponding to an incoming electromagnetic wave, and a matrix array of unit pixels, a unit pixel outputting an analog electric signal in accordance with the charge generated by the charge generation section, (b) a reference signal generation section that generates a reference signal used for conversion of the analog electric signal output from the unit pixel into a digital signal, (c) a local voltage supply circuit that generates a local voltage different from an operation voltage, the local voltage being provided to the reference signal generation section, and the reference signal generation section, based on the local voltage from the local voltage supply circuit, generating the reference signal for the conversion of the analog electric signal output from the unit pixel into the digital signal, (d) a processing section that receives the reference signal from the reference signal generation section and converts, by referring to the reference signal generated by the reference signal generation section, the analog electric signal output from the unit pixel into the digital signal, and
in an operating state, the reference signal generation section keeps a load current of the local voltage supply circuit constant.

* * * * *